US012641668B2

(12) United States Patent
Kim et al.

(10) Patent No.: US 12,641,668 B2
(45) Date of Patent: May 26, 2026

(54) METHOD AND DEVICE FOR COHERENT COMMUNICATION IN MULTI-TRANSMISSION RECEPTION POINT SYSTEM

(71) Applicant: ELECTRONICS AND TELECOMMUNICATIONS RESEARCH INSTITUTE, Daejeon (KR)

(72) Inventors: Cheul Soon Kim, Daejeon (KR); Jae Heung Kim, Daejeon (KR); Sung Hyun Moon, Daejeon (KR); Jung Hoon Lee, Daejeon (KR); Sung Cheol Chang, Daejeon (KR); Young Jo Ko, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 282 days.

(21) Appl. No.: 18/556,794

(22) PCT Filed: Apr. 13, 2022

(86) PCT No.: PCT/KR2022/005367
§ 371 (c)(1),
(2) Date: Oct. 23, 2023

(87) PCT Pub. No.: WO2022/231175
PCT Pub. Date: Nov. 3, 2022

(65) Prior Publication Data
US 2024/0206000 A1      Jun. 20, 2024

(30) Foreign Application Priority Data

| | | |
|---|---|---|
| Apr. 28, 2021 | (KR) | 10-2021-0055282 |
| Jun. 28, 2021 | (KR) | 10-2021-0084178 |
| Mar. 18, 2022 | (KR) | 10-2022-0034270 |

(51) Int. Cl.
*H04W 76/20* (2018.01)
*H04L 5/00* (2006.01)
(Continued)

(52) U.S. Cl.
CPC .......... *H04W 76/20* (2018.02); *H04L 5/0051* (2013.01); *H04W 72/1273* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 2020/0014507 A1* | 1/2020 | Joseph | H04L 5/0091 |
| 2020/0037305 A1* | 1/2020 | Yang | H04W 72/51 |

(Continued)

FOREIGN PATENT DOCUMENTS

| | | |
|---|---|---|
| GB | 2558217 A | 7/2018 |
| KR | 1020200051726 A | 5/2020 |
| WO | 2021030674 A1 | 2/2021 |

OTHER PUBLICATIONS

Qualcomm Incorporated, "Muti-TRP Enhancements", R1-1900905, 3GPP TSG-RAN WG1 Meeting AH-1901, Jan. 12, 2019.
(Continued)

*Primary Examiner* — Faiyazkhan Ghafoerkhan
(74) *Attorney, Agent, or Firm* — Rabin & Berdo, P.C.

(57) ABSTRACT
A method and a device for coherent communication are disclosed. An operating method of a terminal comprises the steps of: receiving, from a first TRP, an RRC message including information indicating the performance of reception operations for the first TRP and a second TRP; performing the reception operations for the first TRP and the second TRP to receive a common DL-RS; and allowing communication with the first TRP and/or the second TRP on
(Continued)

the basis of the common DL-RS, wherein the common DL-RS is co-transmitted in the first TRP and the second TRP.

16 Claims, 11 Drawing Sheets

(51) Int. Cl.
H04W 72/1273 (2023.01)
H04W 74/0833 (2024.01)

(56) References Cited

U.S. PATENT DOCUMENTS

| | | | | |
|---|---|---|---|---|
| 2020/0153543 | A1* | 5/2020 | Khoshnevisan | H04L 27/261 |
| 2020/0305168 | A1* | 9/2020 | Liou | H04L 5/0098 |
| 2020/0350972 | A1* | 11/2020 | Yi | H04B 7/088 |
| 2021/0013943 | A1* | 1/2021 | Manolakos | H04L 1/0013 |
| 2021/0044397 | A1* | 2/2021 | Khoshnevisan | H04L 5/0032 |
| 2021/0076445 | A1* | 3/2021 | Tsai | H04W 74/0833 |
| 2021/0105851 | A1* | 4/2021 | Kim | H04W 76/27 |
| 2021/0135736 | A1* | 5/2021 | Lee | H04L 25/0204 |
| 2021/0185670 | A1* | 6/2021 | Taherzadeh Boroujeni | H04W 56/0045 |
| 2022/0029764 | A1* | 1/2022 | Liou | H04L 5/0094 |
| 2024/0008052 | A1* | 1/2024 | Matsumura | H04W 80/02 |
| 2024/0137901 | A1* | 4/2024 | Manolakos | H04J 3/0661 |
| 2024/0172311 | A1* | 5/2024 | Harada | H04B 7/06964 |
| 2024/0172312 | A1* | 5/2024 | Harada | H04L 5/0053 |
| 2024/0206000 | A1* | 6/2024 | Kim | H04L 5/0051 |
| 2024/0236919 | A9* | 7/2024 | Manolakos | H04W 64/00 |

OTHER PUBLICATIONS

ZTE, "Considerations on beam management for multi-TRP", R1-1906244, 3GPP TSG RAN WG1 #97, May 4, 2019.
NTT Docomo, Inc, "Remaining issues on multi-TRP/panel transmission", R1-2006700, 3GPP TSG RAN WG1 #102-e, Aug. 7, 2020.
ZTE, "Further details on Multi-beam and Multi-TRP operation", R1-2102667, 3GPP TSG RAN WG1 Meeting #104b-e, Apr. 7, 2021.

* cited by examiner

<u>100</u>

METHOD AND DEVICE FOR COHERENT COMMUNICATION IN MULTI-TRANSMISSION RECEPTION POINT SYSTEM

TECHNICAL FIELD

The present disclosure relates to techniques for coherent communication, and more particularly, to techniques for coherent communication in a communication system including one or more transmission reception points (TRPs).

BACKGROUND ART

With the development of information and communication technology, various wireless communication technologies have been developed. Typical wireless communication technologies include long term evolution (LTE) and new radio (NR), which are defined in the $3^{rd}$ generation partnership project (3GPP) standards. The LTE may be one of 4th generation (4G) wireless communication technologies, and the NR may be one of 5th generation (5G) wireless communication technologies.

The 5G communication system (e.g., communication system supporting the NR) using a higher frequency band (e.g., frequency band of 6 GHz or above) than a frequency band (e.g., frequency band of 6 GHz or below) of the 4G communication system is being considered for processing of wireless data soaring after commercialization of the 4G communication system (e.g., communication system supporting the LTE). The 5G communication system can support enhanced mobile broadband (eMBB), ultra-reliable low-latency communication (URLLC), massive machine type communication (mMTC), and the like. Discussion on a sixth generation (6G) communication system after the 5G communication system is in progress.

Meanwhile, a plurality of transmission reception points (TRPs) may be introduced into the communication system. In this case, a terminal may be connected to a plurality of TRPs, and may perform communications with the plurality of TRPs. The plurality of TRPs may provide communication services to the terminal based on various communication schemes. For coherent communication in the communication system including the plurality of TRPs, a method for transmitting and receiving downlink-reference signals (DL-RSs), a method of compensating for a frequency offset in a radio link, and/or a method of compensating for a time offset in a radio link may be required.

DISCLOSURE

Technical Problem

The present disclosure is directed to providing a method and an apparatus for coherent communication in a communication system including one or more TRPs.

Technical Solution

According to a first exemplary embodiment of the present disclosure for achieving the objective, an operation method of a terminal in a communication system including a first TRP, a second TRP, and the terminal may comprise: receiving, from the first TRP, an RRC message including information instructing to perform a reception operation for the first TRP and the second TRP; receiving a first DL-RS by performing the reception operation for the first TRP and the second TRP; and performing communication with at least one TRP among the first TRP and the second TRP based on the first DL-RS, wherein the first DL-RS is received from the first TRP or the second TRP.

The operation method may further comprise transmitting, to the first TRP, information indicating whether the reception operation for the first TRP and the second TRP is supported by the terminal.

The operation method may further comprise receiving, from the first TRP, one or more parameters used for reception of the first DL-RS.

The one or more parameters may include at least one of a physical cell identifier (PCI), a scrambling identifier (ID), a synchronization signal/physical broadcast channel (SS/PBCH) block index, a subcarrier spacing, frequency information of an SS/PBCH block, or a combination thereof.

The first DL-RS may be an SS/PBCH block, a tracking reference signal (TRS), a channel state information-reference signal (CSI-RS), or a demodulation-reference signal (DM-RS).

When the first DL-RS is a DM-RS and the first TRP and the second TRP have a same PCI or when the first DL-RS is a DM-RS and the first TRP and the second TRP have different PCIs, the DM-RS may be used for demodulation of a physical downlink control channel (PDCCH) or a physical downlink shared channel (PDSCH).

Two or more transmission configuration indication (TCI) states may be indicated to the terminal in order for the terminal to receive the first DL-RS.

Two or more TCI-states may be derived from one index indicated to the terminal in order for the terminal to receive the first DL-RS.

The operation method may further comprise receiving, from the first TRP or the second TRP, random access (RA) configuration information associated with the first DL-RS, wherein the communication is an RA procedure based on the RA configuration information.

The operation method may further comprise receiving, from the first TRP or the second TRP, a parameter related to a beam recovery procedure associated with the first DL-RS, wherein the communication is a beam recovery procedure based on the parameter.

According to a second exemplary embodiment of the present disclosure for achieving the objective, an operation method of a first TRP in a communication system including the first TRP, a second TRP, and a terminal may comprise: receiving, from the terminal, information indicating that a reception operation for the first TRP and the second TRP is supported by the terminal; transmitting, to the terminal, an RRC message including information instructing to perform the reception operation for the first TRP and the second TRP; and transmitting a first DL-RS to the terminal.

The operation method may further comprise transmitting, to the terminal, one or more parameters used for reception of the first DL-RS.

The one or more parameters may include at least one of a physical cell identifier (PCI), a scrambling identifier (ID), a synchronization signal/physical broadcast channel (SS/PBCH) block index, a subcarrier spacing, frequency information of an SS/PBCH block, or a combination thereof.

When the first DL-RS is a DM-RS and the first TRP and the second TRP have a same PCI or when the first DL-RS is a DM-RS and the first TRP and the second TRP have different PCIs, the DM-RS may be used for demodulation of a physical downlink control channel (PDCCH) or a physical downlink shared channel (PDSCH).

When the first DL-RS is an SS/PBCH block and the first TRP and the second TRP have a same PCI or when the first DL-RS is an SS/PBCH block and the first TRP and the second TRP have different PCIs, the SS/PBCH block may not be used for a system information acquisition procedure or a paging procedure.

The operation method may further comprise transmitting, to the terminal, at least one of random access (RA) configuration information associated with the first DL-RS or a parameter related to a beam recovery procedure associated with the first DL-RS.

According to a third exemplary embodiment of the present disclosure for achieving the objective, a terminal in a communication system including a first TRP, a second TRP, and the terminal may comprise: a processor; a memory electronically communicating with the processor; and instructions stored in the memory, wherein when executed by the processor, the instructions cause the terminal to: receive, from the first TRP, an RRC message including information instructing to perform a reception operation for the first TRP and the second TRP; receive a first DL-RS by performing the reception operation for the first TRP and the second TRP; and perform communication with at least one TRP among the first TRP and the second TRP based on the first DL-RS, wherein the first DL-RS is received from the first TRP or the second TRP.

The instructions may further cause the terminal to transmit, to the first TRP, information indicating whether the reception operation for the first TRP and the second TRP is supported by the terminal.

Two or more transmission configuration indication (TCI) states may be indicated to the terminal, or two or more TCI-states may be derived from one index indicated to the terminal in order for the terminal to receive the first DL-RS.

The instructions may further cause the terminal to receive, from the first TRP or the second TRP, at least one of random access (RA) configuration information associated with the first DL-RS or a parameter related to a beam recovery procedure associated with the first DL-RS.

Advantageous Effects

According to the present disclosure, a plurality of TRPs may jointly transmit DL-RS(s), and a terminal may perform communication based on the DL-RS(s) received from the TRP(s). Further, for coherent communications, a frequency offset and/or a time offset may be compensated for in advance. Accordingly, the coherent communications can be performed in the communication system, and the communication performance thereof can be improved.

MODE FOR INVENTION

Figure 1:
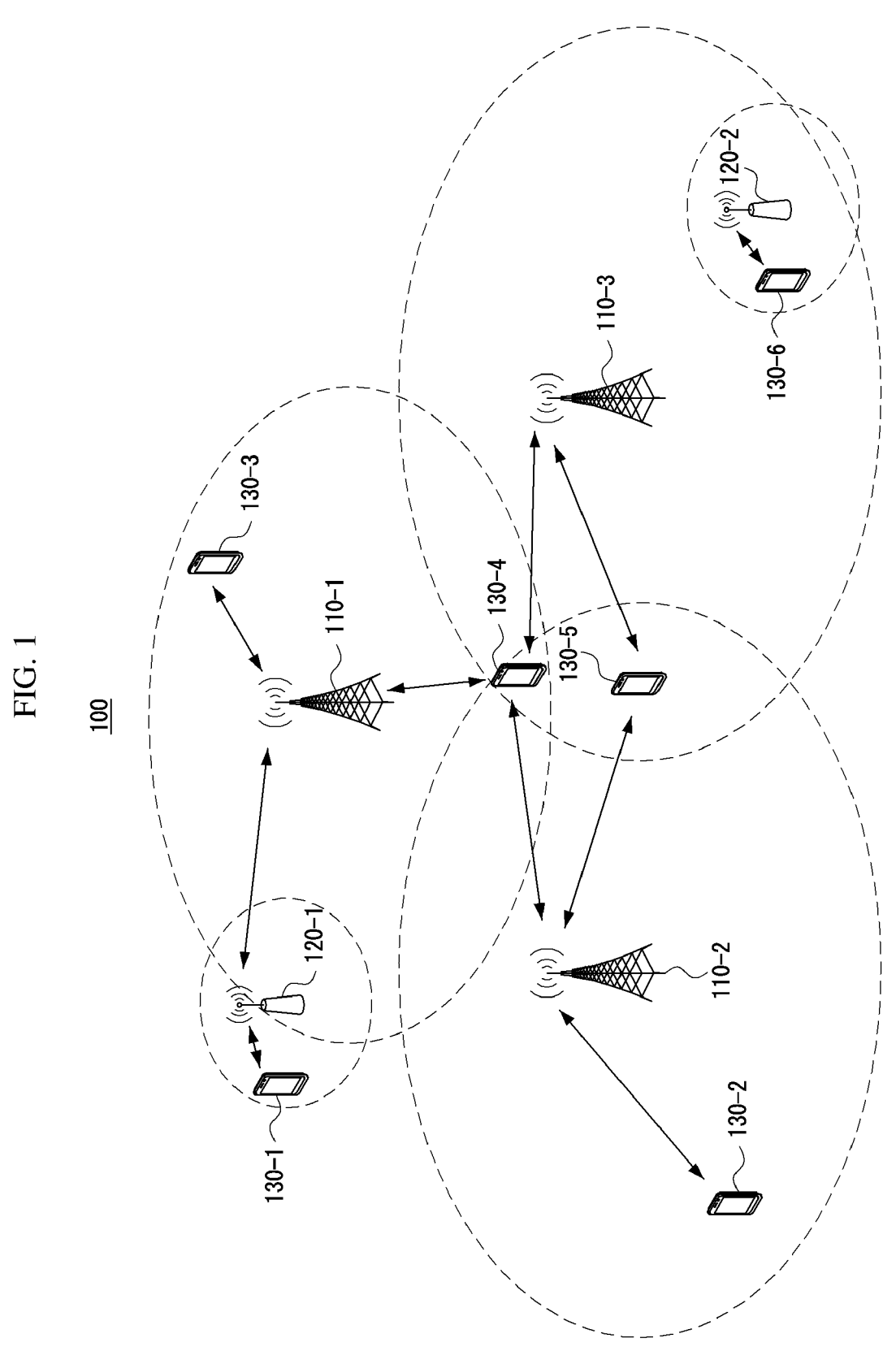
FIG. 1 is a conceptual diagram illustrating a first exemplary embodiment of a communication system.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may mean "at least one of A or B" or "at least one of combinations of one or more of A and B". Also, in exemplary embodiments of the present disclosure, "one or more of A and B" may mean "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the term 'communication system' may be used in the same sense as a 'communication network'.

In exemplary embodiments, 'configuration of an operation (e.g., transmission operation)' may mean 'signaling of configuration information (e.g., information element(s), parameter(s)) for the operation' and/or 'signaling of information indicating performing of the operation'. 'Configuration of information element(s) (e.g., parameter(s))' may mean that the corresponding information element(s) are signaled.

The signaling may be at least one of system information (SI) signaling (e.g., transmission of system information block (SIB) and/or master information block (MIB)), RRC signaling (e.g., transmission of RRC message(s), RRC parameter(s) and/or higher layer parameter(s)), MAC control element (CE) signaling (e.g., transmission of a MAC message and/or MAC CE), PHY signaling (e.g., transmission of downlink control information (DCI), uplink control information (UCI), and/or sidelink control information (SCI)), or a combination thereof.

FIG. 1 is a conceptual diagram illustrating a first exemplary embodiment of a communication system.

Referring to FIG. 1, a communication system 100 may include a plurality of communication nodes 110-1, 110-2, 110-3, 120-1, 120-2, 130-1, 130-2, 130-3, 130-4, 130-5, and 130-6. In addition, the communication system 100 may further include a core network (e.g., serving-gateway (S-GW), packet data network (PDN)-gateway (P-GW), and mobility management entity (MME)). When the communication system 100 is the 5G communication system (e.g., NR system), the core network may include an access and mobility management function (AMF), a user plane function (UPF), a session management function (SMF), and the like.

The plurality of communication nodes 110 to 130 may support the communication protocols (e.g., LTE communication protocol, LTE-A communication protocol, NR communication protocol, etc.) defined by technical specifications of 3rd generation partnership project (3GPP). The plurality of communication nodes 110 to 130 may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like. Each of the plurality of communication nodes may have the following structure.

Figure 2:
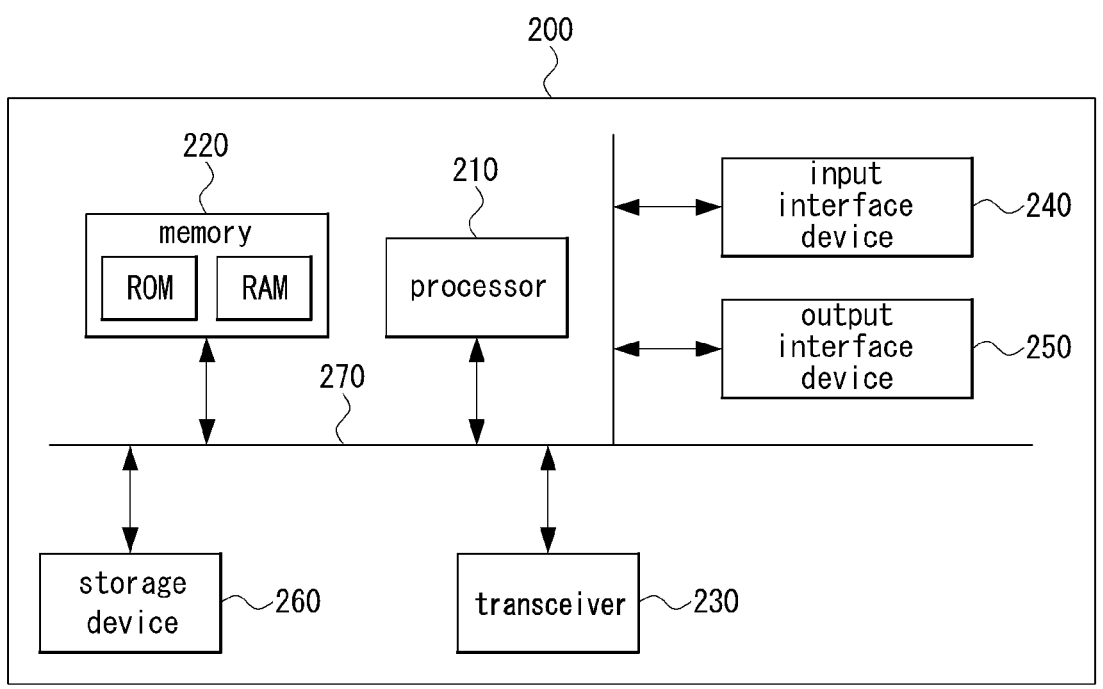
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, an evolved Node-B (eNB), an advanced base station (BTS), a high reliability-base station (HR-BS), a base transceiver station (BTS), a radio base station, a radio transceiver, an access point, an access node, a radio access station (RAS), a mobile multi-hop relay base station (MMR-BS), a relay station (RS), an advanced relay station (ARS), a high reliability-relay station (HR-RS), a home NodeB (HNB), a home eNodeB (HeNB), a roadside unit (RSU), a radio remote head (RRH), a transmission point (TP), a transmission and reception point (TRP), or the like.

Each of the plurality of terminals 130-1, 130-2, 130-3, 130-4, 130-5, and 130-6 may refer to a user equipment (UE), a terminal equipment (TE), an advanced mobile station (AMS), a high reliability-mobile station (HR-MS), a terminal, an access terminal, a mobile terminal, a station, a subscriber station, a mobile station, a portable subscriber station, a node, a device, an on board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (COMP) transmission, a carrier aggregation (CA) transmission, a transmission in unlicensed band, device-to-device (D2D) communication (or, proximity services (ProSe)), Internet of Things (IoT) communications, dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, operation methods of a communication node in a communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of the terminal is described, the corresponding base station may perform an operation corresponding to the operation of the terminal. Conversely, when an operation of the base station is described, the corresponding terminal may perform an operation corresponding to the operation of the base station.

In order to reduce an error rate of data, a low modulation and coding scheme (MCS) level (or, low MCS index) may be applied. In order not to increase a size of a field indicated by downlink control information (DCI), frequently used MCS(s) may be selected. In order to apply a lower MCS, a repeated transmission operation may be supported. In case of applying a quadrature phase shift keying (QPSK) which is the lowest modulation rate, an effect of further reducing the code rate may occur. In particular, since a transmit power is limited in uplink (UL) transmission, the repeated transmission operation may be performed in the time domain rather than in the frequency domain.

In the case of eMBB traffic and URLLC traffic supported by the communication system (e.g., 5G system), a lower MCS may be used for different purposes, respectively. For example, for eMBB traffic, a lower MCS may be required to extend a coverage. On the other hand, for URLLC traffic, a lower MCS may be required to reduce a latency and achieve a lower error rate. Since the requirements are different, the eMBB traffic may be repeatedly transmitted even when a relatively large latency occurs. The URLLC traffic may be transmitted using new MCSs (e.g., low MCS) rather than the repeated transmission. The new MCS may be configured by an RRC message and/or a DCI.

In order to support repeated transmissions for the eMBB traffic in the time domain, a physical uplink shared channel (PUSCH) repetition (e.g., PUSCH repetition type A) may be introduced. In this case, a PUSCH allocated on a slot basis may be repeatedly transmitted. To extend a coverage, a time resource may be allocated over a plurality of slots. When the PUSCH repetition type A is used, the time resource may be configured by an RRC message and/or a DCI. The number of repetitions of the PUSCH may be indicated by the RRC message, and a time resource for transmitting the PUSCH in the first slot may be indicated by the DCI (e.g., in case of type 2 configured grant (CG) or dynamic grant) or the RRC message (e.g., in case of type 1 CG).

Since a latency occurs when the URLLC traffic is repeatedly transmitted, it may not be appropriate to repeatedly transmit the URLLC traffic. However, when a sufficiently low MCS is used, a latency for decoding the URLLC traffic may be reduced. That is, when a sufficiently low MCS is used, the number of resource elements (REs) to which the URLLC traffic is mapped may increase, and the base station (e.g., a decoder of the base station) should wait until all the REs are received. In this case, the latency for decoding the URLLC traffic may be reduced.

However, when a PUSCH to which a rather high MCS is applied is repeatedly transmitted, the base station may perform the decoding only with some REs. Therefore, a timing at which decoding is successful in the repeated PUSCH transmission (e.g., repeated transmission of the PUSCH to which a somewhat high MCS is applied) may be earlier than a timing at which decoding is successful in the non-repeated PUSCH transmission (e.g., transmission of the PUSCH to which a low MCS is applied). When the PUSCH repetition type A is used, an unnecessary latency may occur, and a PUSCH repetition type B may be introduced to reduce the latency due to the repeated transmission. When the PUSCH repetition type B is used, a PUSCH allocated on a mini-slot basis may be repeatedly transmitted. When the PUSCH repetition type B is used, a time resource may be configured by an RRC message and/or a DCI. A combination of a reference time resource of a PUSCH instance and the number of repeated transmissions may be indicated by the DCI (e.g., in case of type 2 CG and/or dynamic grant) or the RRC message (e.g., in case of type 1 CG).

In order to control a transmit power of a sounding reference signal (SRS) resource indicated by an SRS resource indicator (SRI), a base station may estimate a path loss for each SRS resource. The base station may use a DCI to control the transmit power for SRS resource(s). The transmit power of SRS resource(s) may be controlled based on the estimated path loss. The DCI may be a scheduling DCI (e.g., DCI format 0_0, DCI format 0_1, DCI format 0_2, DCI format 1_0, DCI format 1_1, or DCI format 1_2) or a group common (GC)-DCI (e.g., DCI format 2_2 or DCI format 2_3). The DCI may include a field indicating a transmit power control (TPC) command, and the TPC command may be used to control a transmit power of a terminal. For example, the transmit power of the terminal may be increased or decreased based on the TPC command included in the DCI. In order to determine a transmit power of a PUSCH, the terminal may consider a value obtained based on a path loss, a value according to the TPC command included in the DCI, and/or a PUSCH bandwidth indicated by the DCI.

The base station may configure two or more sets to the terminal by using higher layer signaling. The terminal may receive configuration information of the two or more sets from the base station. Element(s) constituting each of the two or more sets may be transmit power parameter(s), and may be indicated to be suitable for different scenarios (e.g., URLLC scenario, eMBB scenario). The terminal may receive a scheduling DCI or activating DCI for allocating a PUSCH resource from the base station, and the scheduling DCI or activating DCI may indicate a set for interpreting transmit power parameter(s). When a different set of transmit power parameter(s) is used, a magnitude of increasing or decreasing a transmit power, which is indicated by the same TPC command, may be different.

When a Type 1 CG or Type 2 CG is used, a transmit power may be determined based on a DCI format 2_3 for an SRI associated with a PUSCH instance. When a Type 2 CG is used, an activating DCI may indicate a set of transmit power parameter(s) applied to a PUSCH occasion. A PUSCH occasion may mean a PUSCH instance. The terminal may obtain a TPC command for an SRI by receiving a GC-DCI, interpret the TPC command to be suitable for the set of transmit power parameter(s) indicated by the base station, and derive a transmit power to be applied to the PUSCH instance based on a result of the interpretation.

In transmitting a dynamically-scheduled PUSCH, the terminal may derive a transmit power to be applied to a PUSCH instance based on a combination of a GC-DCI and a scheduling DCI. By receiving a GC-DCI, the terminal may identify a TPC command for an SRI and store the identified TPC command. In transmitting a dynamically-scheduled PUSCH, a set of transmit power parameter(s) and/or a TPC command applied to a PUSCH occasion may be indicated by a scheduling DCI. The terminal may derive a transmit power applied to a PUSCH instance based on a transmit power for an SRI associated with the PUSCH instance.

Repeated HARQ-ACK transmission may be indicated (or configured) by higher layer signaling for each physical uplink control channel (PUCCH) format. The number of repetitions for a PUCCH format i may be independently set. i may be 1, 3, or 4. The terminal may repeatedly transmit a PUCCH format in slots. In this case, the PUCCH format may be transmitted using the same time resource in each of the slots.

A type of uplink control information (UCI) may be classified according to a type of information included in the UCI. The UCI may include at least one of a scheduling request (SR), L1-reference signal received power (RSRP), HARQ-ACK, or channel state information (CSI). In exemplary embodiments, the UCI and the UCI type may be used with the same meaning. In the repeated transmission operation of UCI, only one UCI type may be transmitted. To support this operation, priorities of the UCI types may be defined in a technical specification. One UCI type may be selected, and a PUCCH including the one UCI type may be repeatedly transmitted. In this case, the terminal may assume that no other UCI types are transmitted before transmission of the corresponding UCI type is completed. To support this operation, the base station may instruct the terminal to transmit UCI (e.g., SR or HARQ-ACK) after transmission of the PUCCH is completed. The latency for transmitting the corresponding UCI may be large, and the latency may act as a constraint on scheduling of the base station.

When it is indicated to transmit HARQ-ACKs in the same slot (or the same subslot) or when PUCCH time resources indicated by DCIs and/or RRC messages allocating physical downlink shared channels (PDSCHs) overlap each other, the terminal may generate a HARQ codebook so that the HARQ-ACKs are to be transmitted on one PUCCH (e.g., one PUCCH time resource). In the HARQ codebook, HARQ-ACK bits may be arranged according to an order defined in a technical specification. Information bits may be generated by the above-described operation. The terminal may generate coded bits by performing an encoding operation.

In the encoding operation, a Reed-Muller code or a polar code may be used. A code rate applied in the encoding operation may be indicated by higher layer signaling. For example, one value for a PUCCH format may be a code rate and may be indicated to the terminal.

One codeword may be mapped to one PUCCH. In a repeated PUCCH transmission operation, one UCI type may be generated as a codeword. When a PUCCH is transmitted once, information bits of one UCI type or two or more UCI types may be concatenated, and the terminal may generate one codeword by performing the same encoding operation on the information bits. When the Reed-Muller code or polar code is used, it may be difficult to implement a soft combining operation. Accordingly, even when a PUCCH is repeatedly transmitted, the same codeword may be repeatedly transmitted, and the base station may perform a chase combining operation on the same codewords. The coded bits or codeword may mean a bit stream in which a plurality of code blocks are concatenated. A modulation operation may be performed on the codeword, and a result of the modulation operation may be mapped to resource elements (REs).

Meanwhile, the same UCI types may be regarded as different information. The same UCI types regarded as different information may be mapped. For example, UCIs may be generated to support traffics having different priorities. UCI (e.g., SR or HARQ-ACK) supporting eMBB traffic may be regarded as information different from UCI (e.g., SR or HARQ-ACK) supporting URLLC traffic. In this case, even when the UCI types are the same, they may be classified as different pieces of information.

The encoded UCI may be mapped to a PUCCH. In a PUCCH transmission operation, the same preprocessing scheme (e.g., spatial information, spatial relation) may be maintained. Alternatively, in a PUCCH transmission operation, use of different preprocessing schemes for respective PUCCHs may be allowed by RRC signaling of the base station.

Figure 3:
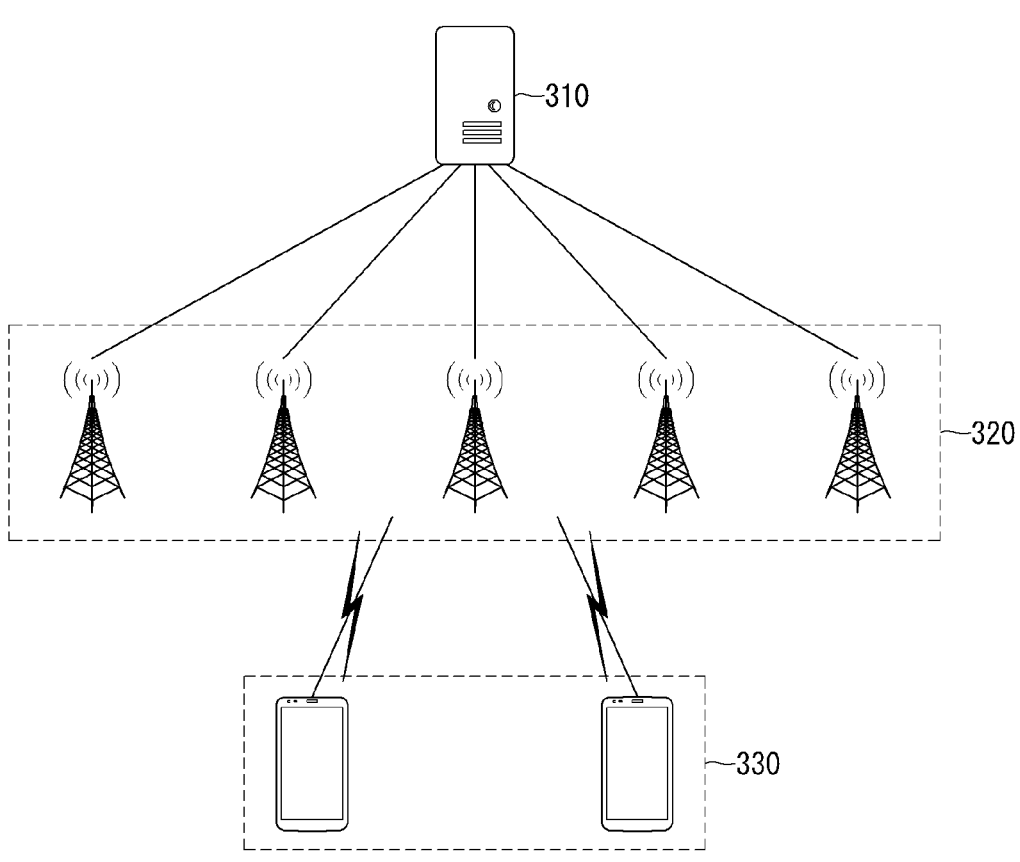
FIG. 3 is a conceptual diagram illustrating a second exemplary embodiment of a communication system.

FIG. 3 is a conceptual diagram illustrating a second exemplary embodiment of a communication system.

Referring to FIG. 3, a communication system may include a base station 310, a plurality of TRPs 320, and one or more terminals 330. The base station 310 may be a server. Exemplary embodiments may be applied to the communication system shown in FIG. 3. The two or more terminals 330 may receive data from the one or more TRPs 320, and may transmit data to the one or more TRPs 320. It may be assumed that one base station or one server 310 performs a management operation and/or a scheduling operation for one or more TRPs among the plurality of TRPs 320. The TRPs 320 may be directly connected with each other. Alternatively, the TRPs 320 may be connected through the base station 310. The above-described connection may be a connection using an Xn interface or a radio interface (e.g., 3GPP NR interface).

A shadow area may occur between coverages supported by the TRPs. Therefore, the TRPs may resolve the shadow area through cooperative transmission. The cooperative transmission may be performed for a terminal located between the TRPs. Even when a shadow area does not occur, qualities of radio links may be improved by installing a large number of TRPs (or base stations) to transmit and receive a lot of data.

According to cooperative transmission and cooperative reception of the TRPs, a communication scheme may be classified into a dynamic point selection (DPS) and a joint transmission (JT). For a specific physical resource block (PRB) set, the DPS may be a scheme of receiving data through one TRP, and the JT may be a scheme of receiving data through two or more TRPs. A dynamic point blanking (DPB) may be a type of the JT. When the DPB is used, the terminal may not receive data from some TRPs and may receive data from the remaining TRPs. The JT may be classified into a coherent JT and a noncoherent JT. The coherent JT or non-coherent JT may be used depending on whether a coherent combining operation is performed on signals received from TRPs.

When synchronization between TRPs is acquired and CSI reports are shared, a performance gain may occur by the coherent combining operation performed by the terminal. When the above-described condition(s) are not satisfied, it may be advantageous in terms of performance that the non-coherent combining operation is performed by the terminal.

Chapter 1 Quasi-Colocation (QCL) Assumption 1.1 Necessity of QCL Assumption for Downlink-Reference Signal (DL-RS)

In order for a terminal to receive DL-RS(s) and/or data from different TRPs, time synchronization information and/or frequency synchronization information may be provided to the terminal in advance. The DL-RS may be a synchronization signal/physical broadcast channel (SS/PBCH) block, a tracking reference signal (TRS), a demodulation-reference signal (DM-RS), and/or a channel state information-reference signal (CSI-RS) (e.g., CSI-RS for tracking). The terminal may perform communications with one or more TRPs based on the DL-RS(s). The terminal may receive the DM-RS(s) and/or data based on the synchronization information. That is, the terminal may perform demodulation and decoding operations on the data. The DL-RS may be classified into a DL-RS for providing time and/or frequency synchronization and a DL-RS for demodulating and/or decoding data.

The terminal may acquire time synchronization and frequency synchronization by using SS/PBCH block(s). The SS/PBCH block may be transmitted from a specific TRP, and the time synchronization and frequency synchronization acquired by the terminal may be time synchronization and frequency synchronization in a radio link between the specific TRP transmitting the corresponding SS/PBCH block and the terminal.

It may be insufficient to perform communication based only on synchronization acquired based on SS/PBCH block(s) in a bandwidth part (BWP) activated in the terminal. In this case, a TRS may be configured (or indicated) to the terminal. The terminal may finely calibrate the time synchronization and frequency synchronization by using the TRS received from the TRP.

The terminal may receive a PDSCH DM-RS or a physical downlink control channel (PDCCH) DM-RS based on the time synchronization and frequency synchronization acquired using the SS/PBCH block and/or TRS. The PDSCH DM-RS may be a DM-RS used for demodulation and/or decoding of a PDSCH. The PDCCH DM-RS may be a DM-RS used for demodulation and/or decoding of a PDCCH. Exemplary embodiments based on the PDSCH DM-RS may be equally or similarly applied to the PDCCH DM-RS. Exemplary embodiments based on the PDCCH DM-RS may be equally or similarly applied to the PDSCH DM-RS.

The terminal may perform demodulation and/or decoding operation on data by using the PDSCH DM-RS. The PDSCH DM-RS and the SS/PBCH block may have a QCL relationship. The QCL relationship between the PDSCH DM-RS and the SS/PBCH block may be Type C defined in Table 1. The PDSCH DM-RS and the TRS may have a QCL relationship. The QCL relationship between the PDSCH DM-RS and the TRS may be Type A defined in Table 1.

TABLE 1

| QCL Type | Property |
| --- | --- |
| Type A | Doppler shift, Doppler spread, average delay, delay spread |
| Type B | Doppler shift, Doppler spread |
| Type C | Doppler shift, average delay |
| Type D | Spatial RX parameter |

According to a configuration of the base station, a TRP transmitting an SS/PBCH block and/or a TRS and a TRP transmitting a PDSCH DM-RS may be different from each other. The TRPs may share the same physical cell identifier (ID). Alternatively, the TRPs may have different physical cell IDs. When reference signals having a QCL relationship are received from different TRPs, some of fading parameters of radio links may be reused. The QCL relationship may be classified as shown in Table 1. The QCL relationship may be utilized not only for a relationship between a DL-RS and a PDSCH DM-RS port but also a relationship between a DL-RS and a PDCCH DM-RS port and a relationship between a DL-RS and a CSI-RS port.

Two QCL types (e.g., QCL-Type1 and QCL-Type2) may be configured to the terminal. QCL-Type1 and QCL-Type2 may indicate different QCL types. QCL-Type2 may be fixed as Type D defined in Table 1. For example, when the terminal operates in a high frequency band (e.g., FR2), QCL-Type2 may be required to determine a reception beam of the terminal. QCL-Type1 or a combination of QCL-Type1 and QCL-Type2 may be configured to the terminal as one transmission configuration indication-state (TCI-state). For a DL-RS transmission/reception operation, at least one of a DCI, MAC CE, or RRC signaling including a TCI-state index for a DL-RS may be transmitted to the terminal.

For a case where a TRP set performs coherent JT in exemplary embodiments, configuration of the terminal may be considered. A TRP set may be determined, and the terminal may assume that time synchronization and/or frequency synchronization between TRPs belonging to the TRP set is acquired to some extent. The TRP set may pre-compensate for a time discrepancy and/or a frequency discrepancy for the corresponding terminal, which may be considered a time error and/or a frequency error. The time error may mean a time offset, and the frequency error may mean a frequency offset.

As a method of pre-compensating for a time error, a method of more finely controlling a timing advance (TA) or a method of combining a Rx-Tx time difference measured by the terminal and a Rx-Tx time difference measured by the base station may be considered. As a method of pre-compensating for a frequency error, a method of precisely matching a frequency of a DL-RS and a frequency of an SRS may be considered.

The TRP (or base station, scheduler) may determine parameter(s) for a PDSCH. In order to determine an MCS and a transport block size (TBS), the terminal may transmit a CSI report to the TRP. The terminal may receive data from two or more TRPs. Since a DL-RS (e.g., SS/PBCH block, TRS, CSI-RS, and/or DM-RS) may be indicated differently for each TRP, the terminal may derive different Rx parameter(s) for each TRP and may receive SS/PBCH block(s) based on the Rx parameter(s).

The terminal may include one or more panels. One panel may be a set of antenna elements, and may be controlled by one or more radio frequency (RF) chains. The RF chain may include at least a power amplifier and phase shifter(s). The terminal (e.g., panel of the terminal) may derive the most suitable Rx parameter(s) to receive the DL-RS. For example, the terminal may derive Rx parameter(s) by which a signal to interference plus noise ratio (SINR) or RSRP of the DL-RS is maximized.

For example, for reception of the DL-RS, (QCL-Type1 and QCL-Type2) or QCL-Type1 may be indicated to the terminal. QCL-Type2 may refer to a DL-RS sharing Rx parameter(s) and may indicate Type D. Accordingly, Rx parameter(s) for a first DL-RS may be derived from a second DL-RS. If the above-described operation is repeated, an SS/PBCH block having a QCL relationship may be derived. An SS/PBCH block having Type D corresponding to QCL-Type2 may be configured to the terminal. Alternatively, a TRS (or CSI-RS) having Type D corresponding to QCL-Type2 may be configured to the terminal. In this case, in order to receive a TRS (or CSI-RS), QCL-Type1 and/or QCL-Type2 may be configured to the terminal again. The DL-RS having Type D corresponding to QCL-Type2 may be another DL-RS or SS/PBCH block. If the DL-RS having Type D is an SS/PBCH block, the terminal may not need to refer to QCL-Type2 of another DL-RS to derive Rx parameter(s).

As described above, the terminal (e.g., panel of the terminal) may assume that the DL-RS is received from one TRP. In the terminal (e.g., panel of the terminal), a reception beam may be configured as shown in FIG. 4.

Figure 4:
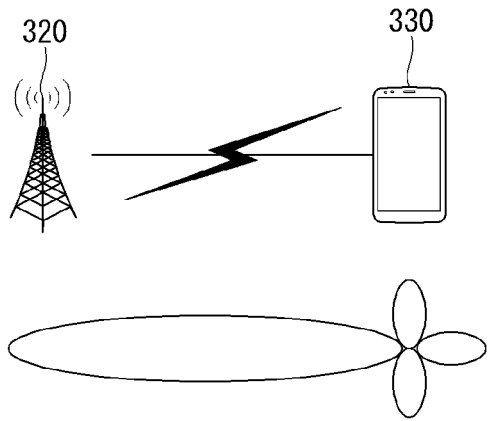
FIG. 4 is a conceptual diagram illustrating a first exemplary embodiment of a reception beam of a terminal receiving a DL-RS from one TRP.

FIG. 4 is a conceptual diagram illustrating a first exemplary embodiment of a reception beam of a terminal receiving a DL-RS from one TRP.

Referring to FIG. 4, the terminal (e.g., panel of the terminal) 330 may include four antenna elements. With four antenna elements, one main lobe and three side lobes may be formed. The terminal 330 may derive a direction of a DL-RS received from the TRP 320 and may apply Rx parameter(s) that matches the direction of the DL-RS.

Extending the above-described operation, the terminal may receive DL-RSs from two or more TRPs. To support this operation, phase shifters steerable in multiple directions may be required in the terminal instead of phase shifters supporting one direction. For example, the antenna elements constituting the terminal (e.g., panel of the terminal) and phase shifters belonging to the antenna elements may each have an independent value.

If the terminal includes phase shifters supporting one direction, the terminal may receive the DL-RS based on a phased array. In this case, a width of a beam formed by the terminal may be narrow. The above-described exemplary embodiment may be suitable for a radio link between the terminal and one TPR in which a dominant path (or dominant ray) of a line of sight (LoS) always exists.

When a radio link with a high proportion of Non-LoS (NLOS) is considered or when two or more TRPs transmit data to the terminal, the terminal may receive DL-RSs in two or more directions. To support this operation, the terminal may form a wide beam or a plurality of narrow beams.

When considering an aperture of the antenna of the terminal, a minimum width of a beam that the terminal can form may be determined, but a maximum width of the beam that the terminal can form may be derived through an optimization procedure.

Figure 5:
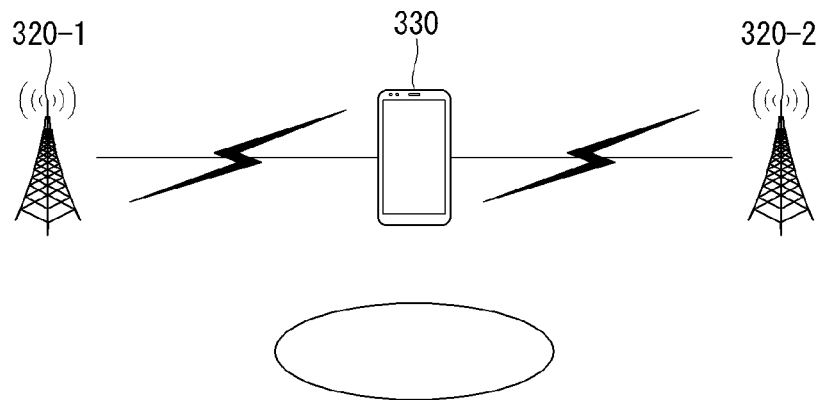
FIG. 5 is a conceptual diagram illustrating a first exemplary embodiment of reception beam(s) of a terminal receiving DL-RSs from two TRPs.

FIG. 5 is a conceptual diagram illustrating a first exemplary embodiment of reception beam(s) of a terminal receiving DL-RSs from two TRPs.

Referring to FIG. 5, each of DL-RSs received from TRPs 320-1 and 320-2 may have a specific angular range. The terminal 330 may perform an optimization procedure that places a constraint so that a gain is constant at an angle within a specific angular range. In this case, a beam pattern obtainable by the terminal may have a wide width in a constant range.

Figure 6:
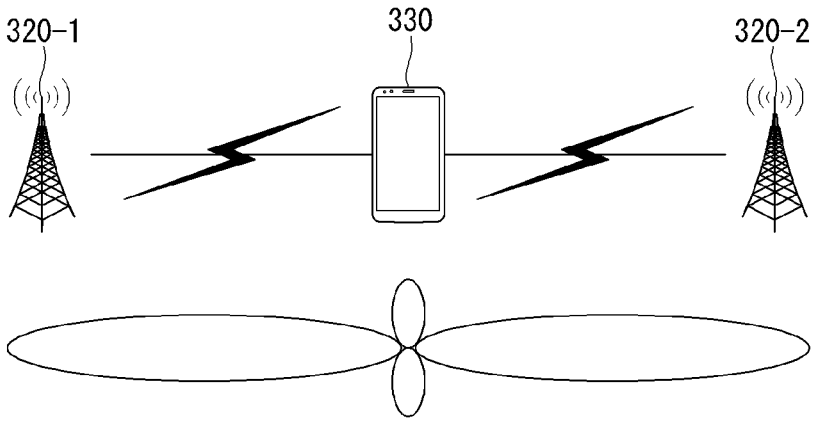
FIG. 6 is a conceptual diagram illustrating a second exemplary embodiment of reception beam(s) of a terminal receiving DL-RSs from two TRPs.

FIG. 6 is a conceptual diagram illustrating a second exemplary embodiment of reception beam(s) of a terminal receiving DL-RSs from two TRPs.

Referring to FIG. 6, when the TRPs 320-1 and 320-2 are determined, the terminal 330 may receive DL-RSs at specific angles. The terminal 330 may perform an optimization procedure that places a constraint so that a gain is constant at specific angles. In this case, a beam pattern obtainable by the terminal may have a narrow width, but an appropriate gain at a reception angle of the DL-RS may be obtained.

In order to obtain the beam based on the above-described optimization procedure, the terminal may control digital/analog elements steering the beam. When the terminal is not able to control the digital/analog elements, the terminal may support only a beam oriented in one direction or a beam for receiving one DL-RS.

Method 1.1-1: Each of the phase shifters belonging to the terminal may have an independent value.

A CSI-RS resource that is a DL-RS may be configured to the terminal, and the terminal may receive a CSI-RS in the CSI-RS resource. It may be configured to the terminal that the CSI-RS is to be used for TRS, beam management, and/or CSI estimation. In the exemplary embodiment of FIG. 4, since the terminal 330 receives a CSI-RS from one TRP 320, the CSI-RS may be configured to the terminal 330 for each TRP 320. In order for the terminal to receive the CSI-RS from each TRP, an SS/PBCH block (or other non-zero power (NZP) CSI-RS) may be indicated based on QCL-Type1 (e.g., Type C). Alternatively, an SS/PBCH block (or other NZP CSI-RS) may be indicated based on QCL-Type2 (e.g., Type D).

According to a proposed method, the terminal may receive a DL-RS (e.g., CSI-RS) from two TRPs. In order to receive a CSI-RS (e.g., one CSI-RS, a common CSI-RS), it may be configured to the terminal through RRC signaling that the terminal is to perform a reception operation for two or more TRPs. The above-described RRC signaling may be transmitted by one TRP among the two or more TRPs. The TRP (or base station) may know capability information of the terminal (e.g., whether the terminal is able to perform a reception operation for two or more TRPs). That is, the terminal may transmit capability information including information indicating whether the terminal supports a reception operation for two or more TRPs to the TRP (or base station). The common CSI-RS may be a CSI-RS that is jointly transmitted by a plurality of TRPs (e.g., a plurality of TRPs belonging to a TRP set).

The TRP may configure all CSI-RS ports of a CSI-RS resource to the terminal. The terminal may receive the CSI-RS from two or more TRPs in the same CSI-RS resource. When the CSI-RS resource is configured with N CSI-RS ports, N CSI-RS ports may be configured for each TRP. The terminal may receive the CSI-RS from all TRPs in CSI-RS resources corresponding to the N CSI-RS ports. N may be a natural number. Since the CSI-RS is transmitted from each TRP, the same large scale fading and/or small scale fading may be applied to the CSI-RS resource in a radio link between the terminal and one TRP. The terminal may receive the CSI-RS from the plurality of TRPs, and fading may be equally applied between the CSI-RS ports.

The assumption that the fading is the same may be interpreted as the above-described QCL relationship. Therefore, "the terminal receives one CSI-RS from two or more TRPs" may mean "a different fading is applied to each TRP". That is, a TCI-state for the CSI-RS resource configured to the terminal may mean two or more QCL relationships. For example, the TCI-state may include two or more QCL-Type1(s) (or QCL-Type1 and QCL-Type2). A plurality of TCI-states may represent TCI-states of the corresponding CSI-RS resource. This may mean that one QCL-Type1 (or QCL-Type1 and QCL-Type2) is derived from one TCI-state.

Method 1.1-2: It may be assumed that the terminal receives a DL-RS from two or more TRPs.

Method 1.1-3: In Method 1.1-2, the terminal may report its capability information to the TRP (or base station).

Meanwhile, one CSI-RS resource may be used by different TRPs. For example, when the number of CSI-RS ports is N, each TRP may transmit the CSI-RS in (N/2×CSI-RS resource) (e.g., CSI-RS resource part). A fading experienced by the CSI-RS resource corresponding to the CSI-RS received by the terminal may be different for each CSI-RS resource part. Therefore, in order to configure the CSI-RS resource, two or more QCL-Type1(s) may be required. The QCL-Type2 corresponding to the QCL-Type1 may be additionally required. In this case, the number of RRC parameters for the CSI-RS resource may be doubled. Therefore, it may be preferable that the divided CSI-RS ports (e.g., CSI-RS resource part) are not used by different TRPs. For this operation, the TRP may configure one more CSI-RS resource for the terminal.

1.2 DL-RS Reception Method

Figure 7:
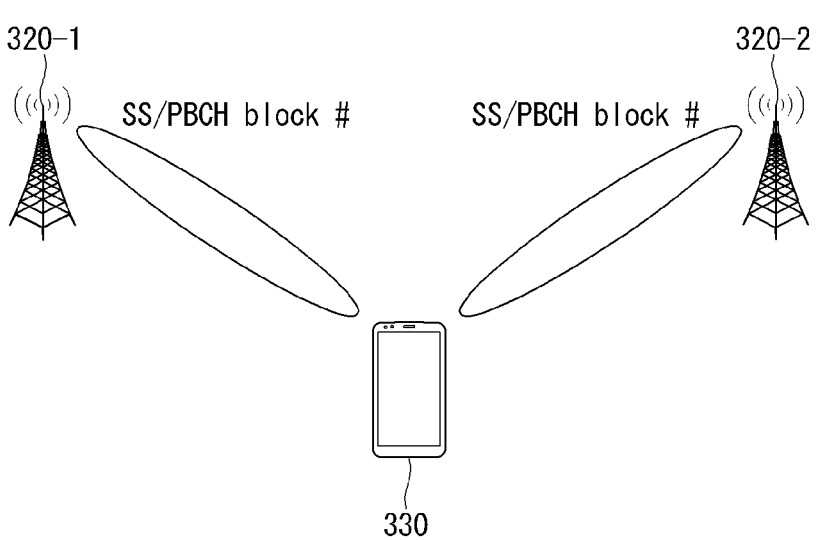
FIG. 7 is a conceptual diagram illustrating a third exemplary embodiment of reception beam(s) of a terminal receiving a DL-RS from two TRPs.

FIG. 7 is a conceptual diagram illustrating a third exemplary embodiment of reception beam(s) of a terminal receiving a DL-RS from two TRPs.

Referring to FIG. 7, two or more TRPs 320-1 and 320-2 may use the same resource (e.g., time, frequency, and/or sequence) to generate a DL-RS (e.g., SS/PBCH block, TRS, CSI-RS, and/or DM-RS). The terminal 330 may receive SS/PBCH block(s) or TRS(s) from the TRP(s) 320-1 and 320-2, obtain QCL relationship(s) (or TCI-state(s)) based on the SS/PBCH block(s) or TRS(s), and obtain a QCL relationship (or TCI-state) applicable to an operation of receiving a CSI-RS or DM-RS from the two or more TRPs 320-1 and 320-2.

In order to improve a reception performance of the above-described DL-RS (e.g., SS/PBCH block, TRS, CSI-RS, and/or DM-RS), fading may be different in radio links between the TRPs 320-1 and 320-2 belonging to a TRP set for jointly transmitting the DL-RS and the terminal 330. The different fading (e.g., different large-scale fading) may cause different time offsets and/or different frequency offsets for the terminal 330. In this case, the reception performance of the DL-RS in the terminal 330 may be deteriorated. If fading can be properly compensated for in the radio links between the TRPs 320-1 and 320-2 belonging to the TRP set and the terminal 330, the terminal 330 may assume that the DL-RS is received from one virtual TRP.

When the above-described method is used, the number of TRPs may not be estimated by the terminal. The reason is that the TRP set uses the same resource (e.g., time, frequency, and/or sequence). In this case, in order to support an operation for the terminal to determine Rx parameter(s), the TRP set may configure the DL-RS that undergoes the same fading to the terminal as QCL-Type2 (e.g., Type D). To support this operation, the TRP set may configure a DL-RS # (e.g., SS/PBCH block, TRS, CSI-RS, and/or DM-RS) to be jointly transmitted to the terminal. The DL-RS # may be referred to as a common DL-RS. In FIG. 7, an SS/PBCH block # may be an SS/PBCH block (e.g., common SS/PBCH block) transmitted jointly by the TRP set. Information for generating the DL-RS # may be shared by the TRP set, and the TRP set may transmit the same DL-RS # (i.e., common DL-RS) based on the shared information. The terminal may receive the DL-RS # from the TRP(s) belonging to the TRP set, and may determine Rx parameter(s) based on the DL-RS #. The DL-RS # may be jointly transmitted by the TRP set. Alternatively, the DL-RS # may be transmitted by one TRP belonging to the TRP set. The terminal may not distinguish the TRP set or one TRP that transmits the DL-RS #. The terminal may receive the DL RS # based on a preconfigured TCI-state (e.g., a previously indicated TCI-state).

The Rx parameter(s) may be used in a reception procedure associated with the DL-RS #. The Rx parameter(s) may include information on a sequence for generating the DL-RS # and/or information (e.g., QCL information, TCI-state information) required for spatial filtering (or beamforming) in the reception procedure of the DL-RS #. When the Rx parameter(s) is QCL information or TCI-state information, the corresponding Rx parameter(s) may include resource information (e.g., resource index and/or sequence information) for another DL-RS providing QCL-Type1 and/or QCL-Type2.

When the DL-RS # received by the terminal is a TRS, CSI-RS, and/or DM-RS, time synchronization and/or frequency synchronization may not be accurate. The reason is that the DL-RS # transmitted by different TRPs undergo different fading. In order to supplement the above problem, the terminal may receive the SS/PBCH block #, and may measure an RSRP (e.g., SS-RSRP) and/or SINR (e.g., SS-SINR) based on the SS/PBCH block #. Alternatively, the terminal may receive different DL-RSs from different TRPs, acquire time synchronization and/or frequency synchronization in consideration of fading of each of the different TRPs, and then receive the DL-RS #.

The terminal may derive an RSRP (e.g., SS-RSRP), SINR (e.g., SS-SINR), and/or CSI by measuring the DL-RS #, and may report a measurement result to the TRP (e.g., TRP set). The TRP set may receive the RSRP (e.g., SS-RSRP), SINR (e.g., SS-SINR), and/or CSI from the terminal, and may adjust the time synchronization and/or frequency synchronization between the terminal and each TRP so that an MCS derived based on the RSRP (e.g., SS-RSRP), SINR (e.g., SS-SINR), and/or CSI becomes higher. The TRP set may use other metrics as well as the RSRP (e.g., SS-RSRP) and/or SINR (e.g., SS-SINR). For example, the TRP (e.g., TRP set) may use an Rx-Tx time difference, a reference signal time difference or received signal time difference (RSTD), and/or a TA. Since the Rx-Tx time difference, RSTD, and/or TA may be used to estimate a propagation delay, the TRP may pre-compensate for a time offset in the radio link between the TRP and the terminal. The TRP may pre-compensate for a frequency offset in consideration of a Doppler effect in the radio link between the TRP and the terminal.

Method 1.2-1: The base station or TRP may provide parameter(s) used in the reception procedure of the DL-RS # to the terminal through RRC signaling. The above-mentioned parameter(s) may include at least one of a physical cell identifier (PCI), scrambling ID, SS/PBCH block index, subcarrier spacing, ssbFrequency, TCI-state information, QCL information, or a combination thereof. ssbFrequency may be frequency information of an SS/PBCH block (i.e., SSB).

Parameters related to other TRPs as well as parameters related to a serving base station (or serving TRP) may be additionally provided to the terminal. Therefore, the terminal may receive the DL-RS # using all the parameters. The terminal may use two or more PCIs or two or more SS/PBCH block indexes in the DL-RS # reception procedure. For example, when the terminal receives the DL-RS # from two or more base stations (or two or more TRPs), two or more PCIs may be used. This operation may mean that two or more SS/PBCH block indexes are used. For another example, when the terminal receives the DL-RS # from two or more TRPs associated with one base station, two or more SS/PBCH block indexes sharing one PCI may be used. Each of the two or more SS/PBCH block indexes may correspond to one TCI-state. When two or more SS/PBCH block indexes are used in the reception procedure of the DL-RS #, two or more TCI-states may be indicated (or configured) to the terminal. Alternatively, two or more TCI-states may be derived from one SS/PBCH block index (or TCI code-point).

Method 1.2-2: When the DL-RS # is the SS/PBCH block #, the SS/PBCH block # may not be used in an initial access procedure of the terminal. Based on information obtainable from the SS/PBCH block #, the terminal may not perform a monitoring operation (e.g., PDCCH monitoring operation) on a Type0/0A-PDCCH common search space (CSS) set and a control resource set (CORESET) (e.g., CORESET corresponding to the Type0/0A-PDCCH CSS set).

When the SS/PBCH block # is received from TRPs having different PCIs, the SS/PBCH block # may not be used for an initial access procedure (e.g., system information acquisition procedure) and/or paging procedure.

For example, the terminal may receive the DL-RS # and may perform a beam management operation for the DL-RS #. The beam management operation may be performed on beam(s) (or TRP(s)) associated with the DL-RS #. The TRP (e.g., one of a plurality of TRPs) may configure random access (RA) configuration information (e.g., random access channel (RACH) occasion(s)) and/or parameter(s) required in a beam recovery procedure associated with the DL-RS # to the terminal through RRC signaling. The terminal may perform RA procedures with the TRP(s) based on the RA configuration information associated with the DL-RS #. The terminal may perform a beam recovery procedure for the TRP(s) based on the parameter(s) required in the beam recovery procedure associated with the DL-RS #.

The terminal may perform radio link monitoring (RLM) by receiving the DL-RS #. The RLM may be performed on a neighbor TRP or TRP set. Alternatively, the terminal may detect a radio link failure (RLF) by receiving the DL-RS #. The detection operation of an RLF may be performed on a neighboring TRP or TRP set. The above-described operations may mean that the DL-RS # is configured as an RLM RS. When an RLF is detected, the terminal may transmit a physical random access channel (PRACH) preamble or a link recovery request (LRR) to the TRP.

The terminal may not always receive the DL-RS # from the same TRP set. The reason is that the DL-RS # is allocated differently for each terminal. In this case, a burden of transmitting the DL-RS # may increase. Since a fading experienced by each terminal varies and a Doppler effect varies according to a mobility of each terminal, it may be preferable to allocate different DL-RS # to different terminals for coherent reception. Therefore, it may be necessary for different terminals to share one DL-RS #.

Method 1.2-3: A reception periodicity and/or a slot offset of the DL-RS # may be configured by RRC signaling. Alternatively, the reception periodicity and/or slot offset of the DL-RS # may be configured by RRC signaling, and the reception periodicity and/or slot offset configured by RRC signaling may be activated or deactivated by MAC signaling.

The TRP set may share the same DL-RS #, but the amount of DL-RS # transmission may be reduced by transmitting the DL-RS # to different terminals at different times. The terminal may perform a measurement operation on the configured DL-RS # or activated DL-RS #. The terminal may not perform a measurement operation on the deactivated DL-RS #. Alternatively, the measurement operation on the DL-RS # may be deactivated. In this case, the terminal may not report a measurement result of the deactivated DL-RS # or a measurement result of the DL-RS # for which the measurement operation is deactivated to the TRP. Alternatively, the terminal may report, to the TRP, the measurement result of the deactivated DL-RS # or the measurement result of the DL-RS # for which the measurement operation is deactivated as a preset value.

The terminal may receive the DL-RS # periodically or semi-statically. In this case, the terminal may repeatedly receive the DL-RS # in one time resource and may accumulate the received DL-RS #. That is, the terminal may periodically perform the measurement operation on the DL-RS #. The terminal may periodically update the measurement result (e.g., measurement value) based on the periodically received DL-RS #. The number of time resources used by the terminal to derive the measurement value of the DL-RS # may be determined by implementation.

Method 1.2-4: A specific field of a DCI or a combination of field values thereof may trigger a measurement operation of the DL-RS # to the terminal.

Method 1.2-5: In Method 1.2-4, a DL-RS # received before being triggered by the DCI may not be utilized, and a DL-RS # received after being triggered by the DCI may be utilized. The terminal may perform a measurement operation on the DL-RS # received first after being triggered by the DCI.

The base station (or TRP) may trigger a measurement operation on the DL-RS # to the terminal. In addition, the base station (or TRP) may instruct the terminal to perform a measurement operation using one DL-RS #. The DL-RS # may be an SS/PBCH block.

Figure 8:
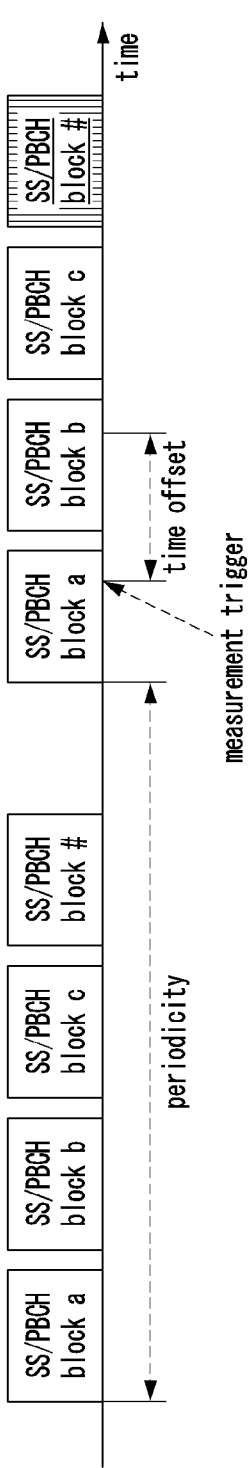
FIG. 8 is a conceptual diagram illustrating a first exemplary embodiment of a method for triggering a measurement operation when a DL-RS # is an SS/PBCH block.

FIG. 8 is a conceptual diagram illustrating a first exemplary embodiment of a method for triggering a measurement operation when a DL-RS # is an SS/PBCH block.

Referring to FIG. 8, the base station (or TRP) may inform configuration information (e.g., positions) of four SS/PBCH blocks (e.g., SS/PBCH block a, SS/PBCH block b, SS/PBCH block c, SS/PBCH block #) to the terminal by using RRC signaling. The terminal may identify the configuration information (e.g., positions) of the four SS/PBCH blocks through RRC signaling. The SS/PBCH block # may be distinguished from other SS/PBCH blocks (e.g., SS/PBCH blocks a, b, and c). A measurement operation on the SS/PBCH block # may be triggered to the terminal.

The terminal may receive a DCI, and the DCI may include information indicating triggering of the measurement operation on the DL-RS # (e.g., measurement trigger in FIG. 8). In this case, the terminal may perform the measurement operation on the DL-RS # (e.g., SS/PBCH block # in FIG.

8) received first after a preset time (e.g., time offset in FIG. 8) elapses from a time of receiving the DCI (e.g., measurement trigger in FIG. 8). When Method 1.2-4 is applied, the terminal may not perform a measurement operation on DL-RS(s) other than the DL-RS #. A measurement operation on the DL-RS # received before the lapse of the preset time from the time of receiving the DCI may not be performed. Accordingly, in FIG. 8, the terminal may perform a measurement operation on one DL-RS # (e.g., SS/PBCH block #).

When the DL-RS # is the SS/PBCH block #, the SS/PBCH block # may be a cell-defining block. Alternatively, the SS/PBCH block # may not be a cell-defining block. In an initial access procedure, the terminal may receive an SS/PBCH block from one TRP. When the initial access procedure is performed based on the SS/PBCH block #, since the SS/PBCH block # may not be received periodically, the initial access procedure may not be efficiently performed. Therefore, the SS/PBCH block # may not be used in the initial access procedure. The SS/PBCH block # may be indicated (or configured) to be not a cell-defining block. The SS/PBCH block # may not be configured to be associated with the Type0-PDCCH CSS set and CORESET (e.g., CORESET #0).

Method 1.2-6: The SS/PBCH block # may not be configured to be associated with the Type0-PDCCH CSS set and CORESET.

1.3 Signaling Method of QCL Information of DL-RS

The SS/PBCH block # transmitted jointly by a TRP 1 and a TRP 2 may be considered. In order to receive the SS/PBCH block #, the terminal may configure RRC connections with the TRP 1 and the TRP 2. For example, the terminal may receive an SS/PBCH block 1 from the TRP 1 and may obtain information required for an RRC connection based on the SS/PBCH block 1. The terminal may receive a PDSCH from the TRP 1 and/or TRP 2 based on dynamic point selection (DPS) or non-coherent JT.

The terminal may derive Rx parameter(s) based on the SS/PBCH block # configured by the TRP(s). The Rx parameter(s) may include QCL-Type2. In the DL-RS reception procedure, the Rx parameter(s) may be used in form of QCL Type D. The above-described operation may also be applied to a communication system including three or more TRPs. In exemplary embodiments, one or more TRPs may be expressed as a TRP set.

The SS/PBCH block (e.g., SS/PBCH block #) may be transmitted from a TRP set. For an operation of receiving a PDSCH or PDCCH from the TRP set based on coherent JT, the SS/PBCH block # may be configured to the terminal. The TRP set may appropriately manage the SS/PBCH block # so that the transmission amount according to the above-described operation is larger than the transmission amount according to non-coherent JT. When the DL-RS is received from the TRP set, QCL-Type1 and/or QCL-Type2 may be provided to the terminal. The DL-RS transmitted by the TRP set may be expressed as the DL-RS #.

Method 1.3-1: In the configuration procedure of the DL-RS # (e.g., SS/PBCH block, TRS, and/or CSI-RS), the SS/PBCH block # may include information indicating type C of QCL-Type1.

Method 1.3-2: In Method 1.3-1, when QCL-Type2 is additionally configured to the terminal, the SS/PBCH block # may include information indicating Type D of QCL-Type2.

In order to receive another DL-RS, the terminal may obtain information of QCL-Type1 and/or QCL-Type2 from the DL-RS #. For example, QCL-Type1 of the DL-RS may be indicated as Type A by the DL-RS #. When QCL-Type2 is configured to the terminal, QCL-Type2 of the DL-RS may be indicated as Type D by the DL-RS # (e.g., SS/PBCH block #).

In the exemplary embodiment of FIG. 5, the terminal may form a wide beam and may receive the DL-RS. For this operation, QCL-Type2 for the DL-RS may be different from QCL-Type2 derived from the SS/PBCH block (or DL-RS) received from one TRP. QCL-Type2 derived based on the assumption that the DL-RS is received from one TRP and QCL-Type2 derived based on the assumption that the DL-RS is received from a TRP set including two or more TRPs may be distinguished from each other.

Since the terminal forms a wide beam, a separate QCL-Type2 may not be configured to the terminal even in a communication system operating in a high frequency band (e.g., FR2). Alternatively, even when QCL-Type2 is configured to the terminal, a DL-RS other than the DL-RS (e.g., DL-RS #), specific value, invalid value, and/or index may be configured to the terminal.

Method 1.3-3: QCL-Type2 may not be configured to the terminal. Alternatively, even when QCL-Type2 is configured to the terminal, a DL-RS other than the DL-RS # may be configured to the terminal.

When Method 1.3-3 is applied to a communication system operating in the FR1 and/or FR2, the terminal may receive the DL-RS by forming a wide beam. Considering a TCI-state of the DL-RS, when a QCL type indicated by QCL-Type1 is configured as one type (e.g., Type A, Type B, or Type C), QCL-Type2 of the TCI-state for the DL-RS may not be configured. Alternatively, QCL-Type2 may be configured. In this case, the terminal may not reuse Rx parameter(s) for receiving the DL-RS indicated by QCL-Type2 as they are. That is, the terminal may derive Rx parameter(s) for receiving the DL-RS indicated by QCL-Type2.

In the exemplary embodiment of FIG. 6, the terminal may form a plurality of narrow beams to receive the DL-RS. For this operation, QCL-Type2 of the TCI-state for the DL-RS may be derived from one or more DL-RSs (e.g., SS/PBCH block, TRS, and/or CSI-RS). For example, when the TCI-state of the DL-RS is configured to the terminal, the terminal may receive information capable of deriving QCL-Type1 and/or QCL-Type2 from each of the TRPs belonging to the TRP set.

For example, the terminal may receive the DL-RS from two TRPs. In this case, in the procedure of configuring the TCI-state for the DL-RS, QCL-Type1 or (QCL-Type1 and QCL-Type2) may be configured to the terminal. It may be assumed that the DL-RS is received only from the TRP 1. QCL-Type1 and/or QCL-Type2 derived based on the above-mentioned assumption may be configured to the terminal. In the procedure of configuring the TCI-state for the same DL-RS, QCL-Type1 or (QCL-Type1 and QCL-Type2) may be configured to the terminal. It may be assumed that the DL-RS is received only from the TRP 2. QCL-Type1 and/or QCL-Type2 derived based on the above-mentioned assumption may be configured to the terminal.

For example, in order to indicate (or configure) the TCI-state for the DL-RS to the terminal, two or more TCI-states may be configured. Each TCI-state may indicate QCL-Type1 and/or QCL-Type2 for a radio link of one TRP.

Two or more DL-RSs having QCL-Type2 indicating Type D may exist. The two or more DL-RSs may be the same DL-RS. The terminal may derive Rx parameter(s) by utilizing the two or more DL-RSs. The terminal may use two or more panels, and may apply the same Rx parameter(s) to each of the two or more panels. In this case, QCL-Type1 and/or QCL-Type2 obtained from the TCI-state may be applied to a DL-RS received in a radio link between the TRP and the panel.

Method 1.3-4: When QCL-Type2 is configured to the terminal, QCL Type D may be indicated to the terminal from two or more DL-RSs. QCL-Type2 corresponding to each QCL Type D may be QCL-Type2 derived from each DL-RS received by the terminal.

For example, the TRP 1 may configure a DL-RS 1 to the terminal as QCL-Type2 of the DL-RS. This configuration may mean that Rx parameter(s) used in the reception operation of the DL-RS transmitted by the TRP 1 are Rx parameter(s) used in the reception operation of the DL-RS 1. Similarly to the operation described above, the TRP 2 may configure a DL-RS 2 to the terminal as QCL-Type2 of the DL-RS. In this case, Rx parameter(s) derived by the terminal may be indicated. The terminal may derive Rx parameter(s) applied to the reception operation of the DL-RS by using Rx parameter(s) for the reception operation of each of the DL-RS 1 and the DL-RS 2 by implementation.

In a PDSCH or PDCCH reception procedure, the terminal may apply Method 1.3-4. In this case, the base station (or TRP set) may transmit a PDSCH or PDCCH by using the same time and frequency resource. The terminal may receive the PDSCH or PDCCH. The Rx parameter(s) used in the above-described reception operation may be derived from TCI-state(s) indicated by a scheduling DCI for allocating the PDSCH, activating DCI, or MAC CE. The terminal may derive each QCL-Type2 from two or more DL-RSs. Alternatively, the terminal may derive one QCL-Type2 from two or more DL-RSs. The terminal may perform a channel estimation operation based on a PDSCH DM-RS or PDCCH DM-RS by using information of the derived QCL-Type2.

When the terminal has one panel, Rx parameter(s) may be determined such that one panel forms two or more lobes (e.g., a main lobe and/or side lobe(s)). When the terminal has two or more panels, Rx parameter(s) for receiving using one or more lobes in each of the two or more panels may be determined.

Chapter 2 Methods for Compensating for a Frequency Offset

For a coherent reception operation for a TRP set, the terminal may assume that there is no frequency offset for a signal received from each TRP. Alternatively, the terminal may assume that a fairly small frequency offset exists for a signal received from each TRP. This is because a time offset can be compensated for in a channel estimation procedure for a radio link, but a frequency offset is expressed as a different value for each subcarrier and reflected in a channel. Therefore, there is a limit in compensating for the frequency offset using the DM-RS.

When a DL-RS (e.g., SS/PBCH block, TRS) is received from one TRP, the terminal may compensate for a frequency offset through a local oscillator and/or baseband processing. When an SS/PBCH block and/or TRS is received, the terminal may align a frequency of the local oscillator with a frequency of the SS/PBCH block and/or TRS to acquire time synchronization and frequency synchronization. However, due to a performance limit of the local oscillator of the terminal, the frequency offset may not be completely compensated for by the local oscillator, and a residual frequency offset may exist. In addition, since there is a difference between a reception time of the SS/PBCH block and/or TRS and a reception time of an actual PDSCH, even when the local oscillator of the terminal perfectly compensates for the frequency offset, the terminal may need to re-estimate a residual frequency offset due to the time difference. In order to compensate for the residual frequency offset, additional processing based on the TRS, SS/PBCH block, and/or PDSCH DM-RS may be performed in the baseband.

When the terminal has mobility, a Doppler effect with respect to the TRP may occur. A frequency offset may occur due to the Doppler effect. The terminal may compensate for the frequency offset as much as possible by adjusting the frequency of the local oscillator. Alternatively, the terminal may compensate for the frequency offset as much as possible through additional processing in the baseband. In order to compensate for the frequency offset, exemplary embodiment(s) below or a combination of the exemplary embodiment(s) below may be used.

2.1 Methods for Compensating for a Doppler Effect

For a coherent reception operation for a TRP set, a frequency offset for a TRP may be pre-compensated as earlier as possible. The TRP may pre-estimate a Doppler effect (e.g., Doppler shift, Doppler spread) in a radio link between the TRP and the terminal. The TRP may estimate a frequency offset by receiving an SRS of the terminal. A frequency at which the terminal's local oscillator operates for SRS transmission may not need to be accurately known to the TRP.

The TRP may estimate the frequency offset of the SRS and may utilize the frequency offset in a channel estimation procedure. Even when a frequency offset by the local oscillator of the terminal and a frequency offset by the Doppler effect occur, the TRP does not need to distinguish between the frequency offset by the local oscillator and the frequency offset by the Doppler effect. However, for a coherent reception operation for the TRP set, the frequency offset by the local oscillator and the frequency offset by the Doppler effect need to be distinguished from each other.

Figure 9:
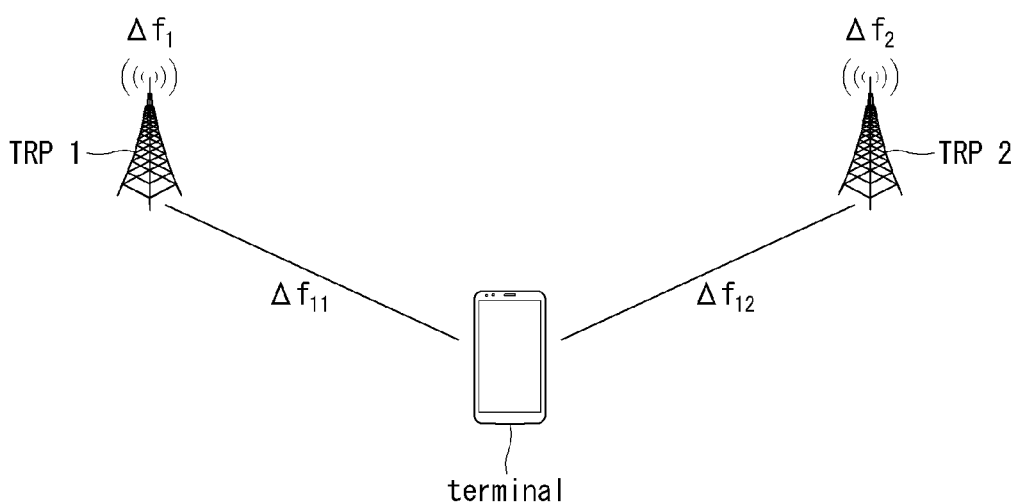
FIG. 9 is a conceptual diagram illustrating a first exemplary embodiment of a frequency offset between a TRP set and a terminal.

FIG. 9 is a conceptual diagram illustrating a first exemplary embodiment of a frequency offset between a TRP set and a terminal.

Referring to FIG. 9, a TRP set may include two TRPs (e.g., TRP 1 and TRP 2). A local oscillator of the TRP 1 may have a frequency offset $\Delta f_1$, and a local oscillator of the TRP 2 may have a frequency offset $\Delta f_2$. An additional frequency offset $\Delta f_{11}$ due to a Doppler effect may occur in a radio link between the TRP 1 and the terminal, and an additional frequency offset $\Delta f_{12}$ due to a Doppler effect may occur in a radio link between the TRP 2 and the terminal. When the terminal is stationary, the above-described additional frequency offsets may not occur.

A frequency offset of a local oscillator of the terminal may be expressed as $\Delta g_1$. The terminal may receive a DL-RS (e.g., SS/PBCH block, TRS, CSI-RS) from the TRP, and may estimate a frequency offset based on the DL-RS. In the frequency offset estimation procedure, the terminal may adjust the frequency offset $\Delta g_1$ of the local oscillator and may estimate the frequency offset for the radio link between the terminal and the TRP 1 through additional processing in the baseband. Since $\Delta g_1$ refers only to the frequency offset caused by the local oscillator, in general, '$\Delta g_1 \approx \Delta f_1 + \Delta f_{11}$' may be established.

The terminal may apply the frequency offset of the local oscillator of the terminal as it is in order to transmit the SRS to the TRP 1. A frequency offset $\Delta G_1$ for a signal (e.g., SRS) received by the TRP 1 may be a value to which the Doppler effect is reflected. That is, the frequency offset $\Delta G_1$ at the TRP 1 may be expressed as '$\Delta G_1 = \Delta g_1 + \Delta f_{11}$'. Through adjustment of the local oscillator of the TRP 1 and/or additional processing in the baseband, the frequency offset for the SRS at the TRP 1 may be compensated for.

The TRP 1 may transmit a signal to the terminal after compensating for the Doppler effect in advance. For coherent reception for the TRP set, Method 2.1-1 may be applied.

Method 2.1-1: In an SRS transmission procedure, the terminal may apply the frequency offset $\Delta g_1$. $\Delta g_1$ may include a residual frequency offset. $\Delta g_1$ may be defined as '$\Delta g_1 \approx \Delta f_1 + \Delta f_{11}$'.

When Method 2.1-1 is applied, the frequency offset $\Delta G_1$ for a signal received by the TRP 1 may be calculated based on '$\Delta G_1 \approx \Delta g_1 + \Delta f_1 = \Delta f_1 + 2 \cdot \Delta f_{11}$'. The TRP 1 may estimate $\Delta f_{11}$ by comparing $\Delta g_1$ and $\Delta G_1$. This may mean that the DL-RS and the SRS are equal to each other in terms of frequency offset.

In the SRS transmission procedure, spatial relation information may be configured to the terminal by RRC signaling. The terminal may derive an SRS preprocessor by using a beam in which the SS/PBCH block, CSI-RS, or TRS is received. Alternatively, the terminal may reuse a preprocessor applied for transmission of another SRS. When Method 2.2-1 is applied, the SRS and the DL-RS may be expressed as satisfying Type B of QCL-Type1.

Method 2.1-2: In Method 2.1-1, when the SRS configuration indicates Type B of QCL-Type1, another SRS and/or DL-RS (e.g., CSI-RS, TRS, SS/PBCH block) may be configured.

Communication between the terminal and the TRP 2 may be performed correspondingly to the communication between the terminal and the TRP 1 described above. A signal to which a sum of the frequency offset $\Delta f_2$ of the TRP 2 and the frequency offset $\Delta f_{12}$ due to the Doppler effect is reflected may be received by the terminal. The local oscillator of the terminal may estimate the frequency offset of the radio link between the terminal and the TRP 2. In general, $\Delta g_2$ may be different from '$\Delta f_2 + \Delta f_{12}$'.

The terminal may apply the frequency offset of the local oscillator of the terminal as it is in order to transmit the SRS to the TRP 2. A frequency offset $\Delta G_2$ for a signal (e.g., SRS) received by the TRP 2 may be expressed as '$\Delta G_2 \approx \Delta g_2 + \Delta f_{12}$'. Through adjustment of the local oscillator of the TRP 2 and/or additional processing in the baseband, the frequency offset for the SRS at the TRP 2 may be compensated for.

When Method 2.1-1 is applied, the TRP 2 may assume '$\Delta g_2 \approx \Delta f_2 + \Delta f_{12}$'. Accordingly, the frequency offset $\Delta G_2$ at the TRP 2 may be calculated based on '$\Delta G_2 \approx \Delta g_1 + \Delta f_{12} \approx \Delta f_2 + 2 \cdot \Delta f_{12}$'. The TRP 2 may estimate $\Delta f_{12}$ by comparing $\Delta g_1$ and $\Delta G_2$.

When the frequency offsets at the TRPs belonging to the TRP set are kept the same (i.e., $\Delta f_1 \approx \Delta f_2$), and a Doppler effect estimated in each TRP is pre-compensated, the terminal may assume that the frequency offsets for the signals received from the TRP set are identical or similar to each other. The TRPs belonging to the TRP set may acquire frequency synchronization with each other through a backhaul link.

For another example, the terminal may receive a DL-RS from the TRP 1 belonging to the TRP set and may transmit an SRS to the TRP 1 based on the DL-RS. In this case, the TRP 2 belonging to the TRP set may also receive the SRS of the terminal. Based on the above equation, the TRP 2 may derive a Doppler effect in the radio link.

It may be assumed that the terminal transmits the SRS by using the DL-RS received from the TRP 1. In this case, if Method 2.1-1 is applied, the frequency offset for the signal (e.g., SRS) received by the TRP 1 may be '$\Delta G_1 \approx \Delta g_1 + \Delta f_{11} = \Delta f_1 + 2 \Delta f_{11}$', and $\Delta f_{11}$ may be derived based on the above-described equation. The TRP 2 may receive the same SRS as the TRP 1, and the frequency offset for the received signal (e.g., SRS) may be '$\Delta G_2 = \Delta g_1 + \Delta f_{12} = \Delta f_1 + \Delta f_{11} + \Delta f_{12}$'. When the TRP 1 informs the TRP 2 of '$\Delta f_1 + \Delta f_{11}$' through a backhaul, the TRP 2 may estimate $\Delta f_{12}$. Alternatively, when frequency synchronization is acquired to some extent between TRPs belonging to the TRP set (i.e., $\Delta f_1 \approx \Delta f_2$), and the TRP 1 informs $\Delta f_{11}$ to the TRP 2, the TRP 2 may estimate $\Delta f_{12}$.

Since the transmit power and TA of the terminal are targeted to the TRP 1, orthogonality of signals and/or channels received at the TRP 2 may not be guaranteed. In this case, it may be preferable for the TRP 2 to transmit a separate DL-RS to the terminal.

Meanwhile, in the SRS transmission procedure, a processing time for updating (e.g., changing) the frequency offset in the terminal may be required. The processing time may be predefined in a technical specification. Alternatively, the base station (or TRP) may configure the processing time to the terminal using RRC signaling. The terminal may not update the frequency offset before the processing time elapses.

Method 2.1-3: The processing time for changing (e.g., updating) the frequency offset may be indicated (e.g., configured) to the terminal.

The terminal may not change the frequency offset during transmission of a PUSCH or PRACH preamble other than SRS. When the processing time elapses from the last transmission of the terminal, the terminal may change the frequency offset. The above-described operation may be applied to the exemplary embodiment of FIG. 10 (e.g., TDD system) and the exemplary embodiment of FIG. 11 (e.g., FDD system).

Figure 10:
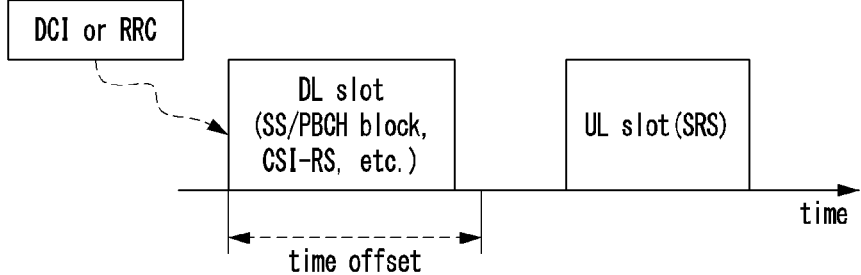
FIG. 10 is a conceptual diagram illustrating a first exemplary embodiment of a method of changing a frequency offset of an SRS in a TDD system.
Figure 11:
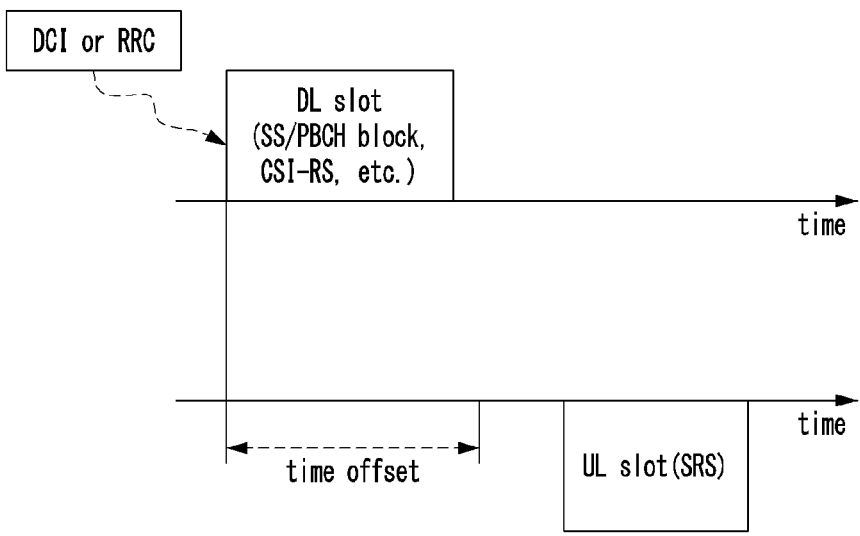
FIG. 11 is a conceptual diagram illustrating a first exemplary embodiment of a method of changing a frequency offset of an SRS in an FDD system.

FIG. 10 is a conceptual diagram illustrating a first exemplary embodiment of a method of changing a frequency offset of an SRS in a TDD system, and FIG. 11 is a conceptual diagram illustrating a first exemplary embodiment of a method of changing a frequency offset of an SRS in an FDD system.

Referring to FIGS. 10 and 11, the TRP (or base station) may configure a time offset (e.g., processing time) to the terminal. The terminal may change (e.g., update) the frequency offset of the SRS after the time offset elapses.

2.2 Methods for Using a Channel Feedback

In a PDSCH reception procedure, the terminal may assume that the same precoding is applied on a precoding resource block group (PRG) basis. In a procedure of receiving a PDSCH transmitted by a TRP set, if there is a residual frequency offset, the performance of channel estimation may be deteriorated. While the terminal estimates a channel, a channel state may be changed even in one physical resource block (PRB). For example, a shape of a modulation symbol may be interpreted as slightly rotating for each subcarrier. When the channel estimation operation is performed in units of PRBs, the performance of the channel estimation may be deteriorated.

In order to solve the above-mentioned problem, the TRP may subdivide the unit of a PRG. For example, the TRP (e.g., base station) may indicate (e.g., configure) a PRG configured in a small number of PRBs (e.g., upto one PRB) to the terminal by using RRC signaling and/or a DCI. In this case, even when there is a residual frequency offset, since the number of PRBs estimated by a PDSCH DM-RS is small, the performance of channel estimation may be less deteriorated.

In order for the TRP to configure the PRG to be small, a narrowband CSI report may be required. When the terminal transmits a CSI report in units of a small number of PRBs (e.g., upto one PRB), the TRP may determine precoding based on the CSI report.

Two or four consecutive PRBs in the frequency domain may be configured as a PRG. Alternatively, two or four consecutive PRBs in the frequency domain may be configured as a minimum bandwidth for CSI reporting. A CSI reporting for a PRG including one PRB or for one PRB may be configured to the terminal.

Chapter 3 Methods for Compensating for a Time Offset 3.1 Reception of a TA

The terminal may receive a DL-RS from a TRP set. Therefore, it may be preferable for a TRP belonging to the TRP set to compensate for a time offset in advance in a radio link between the TRP and the terminal. A discrepancy, which may be considered as an error, in the time domain may be divided into a large-scale fading and a small-scale fading. In the large-scale fading, a propagation delay may be regarded as the largest part.

The TRP may manage a timing advance (TA) loop to estimate a propagation delay in a radio link between the TRP and the terminal (e.g., a panel of the terminal). For this operation, a plurality of TA loops may be configured to the terminal.

In a method of estimating a propagation delay based on a TA, an estimation error may be determined based on a periodicity and a bandwidth of an SRS configured to the terminal. In order to reduce an error in one TA loop, the amount of SRS may be increased. When the number of TA loops increases, the amount of DCI (e.g., group common DCI, DCI format 2_3) as well as MAC signaling (e.g., MAC CE) for controlling the TA loops may increase.

Some TA loops among the configured TA loops may be activated or deactivated. A TA command may be given to the activated TA loop. The TRP may indicate a TA command for the activated TA loop to the terminal.

Method 3.1-1: The TRP (or base station) may configure a plurality of TA loops (e.g., two or more TA loops) to the terminal.

Method 3.1-2: Some TA loops among the configured TA loops may be activated.

In order to activate specific TA loop(s), the TRP may transmit MAC signaling indicating the specific TA loop(s) to the terminal. For example, the MAC CE may include a bitmap. The number of bits included in the bitmap may be the same as the number of TA loops configured by the TRP. The TA loop(s) corresponding to the bit(s) set to a first value (e.g., 0) in the bitmap may be deactivated. The TA loop(s) corresponding to the bit(s) set to a second value (e.g., 1) in the bitmap may be activated. For another example, the MAC CE may include an index, and a TA loop corresponding to the index may be activated or deactivated.

In the activated TA loop, a first timing advance command (TAC) indicated by the TRP to the terminal and a non-first TAC indicated by the TRP to the terminal may be distinguished. The first TAC received at the terminal may indicate an absolute value of a TA. If a TAC (e.g., non-first TAC) is received after the first TAC, the terminal may accumulate TA values. Alternatively, the TRP (or base station) may transmit MAC signaling indicating transmission of the absolute value of the TA or transmission of a relative value of the TA to the terminal. When the MAC signaling indicates transmission of a relative value of the TA, the terminal may accumulate the received relative values of the TA. The MAC signaling may instruct the terminal to receive the relative values of the TA and accumulate the received relative values of the TA.

Two or more TACs for one TA loop may be used. This may mean that the TAC included in the MAC CE may be extended. The TRP (or base station) may transmit a MAC CE including two or more TACs to the terminal. The terminal may receive the MAC CE from the TRP (or base station) and may derive two or more TACs from the MAC CE. Each of the two or more TACs may correspond to a propagation delay between the terminal and each TRP.

Method 3.1-3: The number of timing advance groups (TAGs) may be configured to increase.

No more than four TAGs may be configured. The TAG(s) may be introduced to support inter-band carrier aggregation (CA). If operating frequencies are significantly different, propagation delays may be significantly different. In addition, the TAG(s) may be introduced to support dual connectivity (DC). Since a master cell group (MCG) and a secondary cell group (SCG) may exist in different geographic locations, propagation delays thereof may have independent values.

In a scenario where the terminal is connected to a TRP set, it is necessary to manage TAs with TRPs that exist in geographically different locations as in the DC. When many TRPs belong to the TRP set, it may be preferable for a plurality of TAGs to be configured to the terminal.

Figure 12:
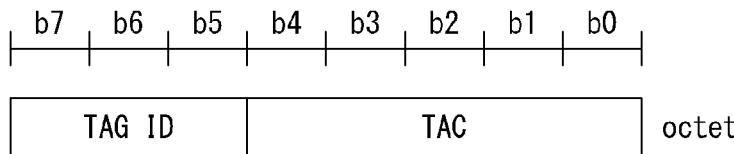
FIG. 12 is a conceptual diagram illustrating a first exemplary embodiment of a MAC CE for a plurality of TAGs.

FIG. 12 is a conceptual diagram illustrating a first exemplary embodiment of a MAC CE for a plurality of TAGs.

Referring to FIG. 12, a MAC CE may include a TAG ID and a TAC. The TAG ID may be represented by 3 bits, and the TAC may be represented by 5 bits. When five or more TAGS are configured, the TAG ID may be represented by three or more bits. When the size of the TAG ID field increases, the size of the TAC field may decrease.

Alternatively, when the TRPs belonging to the TRP set belong to different TAGs, the ID for the TRP set (e.g., PCI or scrambling ID for identifying specific TRPs) may be included in the MAC CE. The association of TAGs with each other may be configured by RRC signaling. In this case, the one or more least significant bits (LSBs) or the one or more most significant bits (MSBs) of the MAC CE interpreted by the terminal may be the ID of the TRP set or an ID of a combination of TAGs (e.g., an index indicating a combination of TAGs).

Method 3.1-4: The TRP (or base station) may configure a TRP set or TAG combination (e.g., a combination of TAGs) to the terminal by using RRC signaling, and transmit a MAC CE including a TRP set ID or a TAG combination ID to the terminal.

For example, the LSB(s) or MSB(s) of the MAC CE may mean the TRP set ID. If the TRP set or TAG combination is not configured to the terminal by RRC signaling, the MAC CE (e.g., LSB(s) or MSB(s) of the MAC CE) may not be interpreted as a TAG ID. When the TRP set or TAG combination is configured to the terminal by RRC signaling, the MAC CE (e.g., LSB(s) or MSB(s) of the MAC CE) may be interpreted according to Method 3.1-4. The TRP set ID may be represented by two bits.

Figure 13:
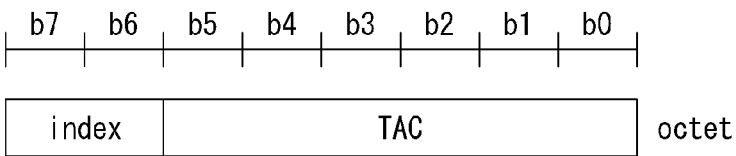
FIG. 13 is a conceptual diagram illustrating a first exemplary embodiment of a MAC CE including a TRP set ID (or TAG combination ID) and a TAC.

FIG. 13 is a conceptual diagram illustrating a first exemplary embodiment of a MAC CE including a TRP set ID (or TAG combination ID) and a TAC.

Referring to FIG. 13, a MAC CE may include an index and a TAC. The index may be represented by 2 bits, and the TAC may be represented by 6 bits. The index included in the MAC CE may be a TRP set ID or a TAG combination ID (e.g., an index to indicate a TAG combination ID or a TAG set).

The MAC CE may include a PCI. In this case, a PCI for a serving base station (or reference TRP) of the terminal may not be included in the MAC CE, and a PCI for another base station (or another TRP) may be included in the MAC CE. An additional PCI may be indicated to the terminal by RRC signaling. The MAC CE may include a PCI and a TAC corresponding to the PCI. The TAC may be concatenated with the PCI.

When a TRP set or a TAG combination is configured to the terminal, the MAC CE indicating the TA may include a plurality of TACs. It may be preferable for each TAC to correspond to a TRP set or TAG combination. In a TA update procedure, a propagation delay may be changed by mobility of the terminal. When the terminal is connected to the TRP set, it may be preferable to update TAs between all TRPs belonging to the TRP set and the terminal. One MAC CE may include TACs (e.g., absolute TACs) for two or more TAGs.

Method 3.1-5: The MAC CE may include TACs for two or more TAs or two or more TAGS.

In order for the MAC CE to include two or more TAGS, the corresponding MAC CE may be represented by two or more octets. One TAG ID and one TAC may be expressed by one octet. A reference TAG may be configured with a TAG ID and a TAC. A TAG other than the reference TAG may be configured with only a TAC without a TAG ID. When a TAG ID is indicated, TAGs associated with the terminal may also be determined. Therefore, the terminal may know an order of interpreting TACs.

Method 3.1-6: Two or more TAGS (or TAs) may be associated with each other, and a TA of the associated TAGs (or TAs) may be expressed as a difference with respect to a TA of a reference TAG.

The TRP (or base station) may inform the terminal that two or more TAGS (or TAs) are associated with each other using RRC signaling. One TAG among the associated TAGs may be regarded as a reference TAG. One TA among the associated TAs may be regarded as a reference TA. An absolute TAC or a TAC for the reference TAG (or reference TA) may be indicated (e.g., configured) to the terminal. According to Method 3.1-6, a TA of a TAG (or TA) may be expressed as a difference from the TA of the reference TAG (or the reference TA). The above operation may be applied to the absolute TAC or the TAC.

Figure 14:
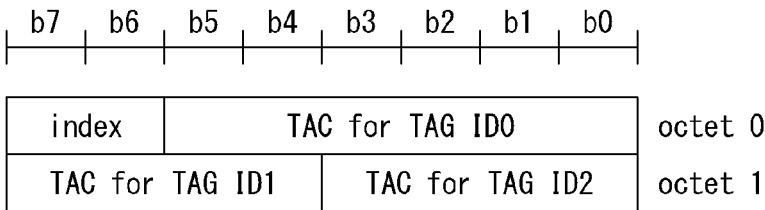
FIG. 14 is a conceptual diagram illustrating a first exemplary embodiment of a MAC CE including a TAC of each TRP (or each TAG) for a TRP set ID (or TAG combination ID).

FIG. 14 is a conceptual diagram illustrating a first exemplary embodiment of a MAC CE including a TAC of each TRP (or each TAG) for a TRP set ID (or TAG combination ID).

Referring to FIG. 14, a MAC CE may include a TRP set ID and TACs. When a TRP set ID indicates 3 TRPs, the MAC CE may include 3 TACs for 3 TRPs. A TAG ID0 may be a reference TAG ID. A TAC (or TA) for the reference TAG ID0 may be expressed by 6 bits. A TAC (or TA) for each of a TAG ID1 and a TAG ID2 may be expressed by 5 or less bits. The number of bits representing a TAC (or TA) for each of the TAG ID1 and the TAG ID2 may be defined in a technical specification. For example, the TAC (or TA) for each of the TAG ID1 and the TAG ID2 may be represented by 4 bits. The TA for each of the TAG ID1 and TAG ID2 may be expressed as a difference from that of the reference TAG ID.

When a TRP set is configured to the terminal, one or more TAs may be deactivated. Therefore, two or less TACs may be included in the MAC CE. The bits remaining in an octet 1 may be remained to be uninterpreted by the terminal. The terminal may regard the bits remaining in the octet 1 as reserved bits.

Figure 15:
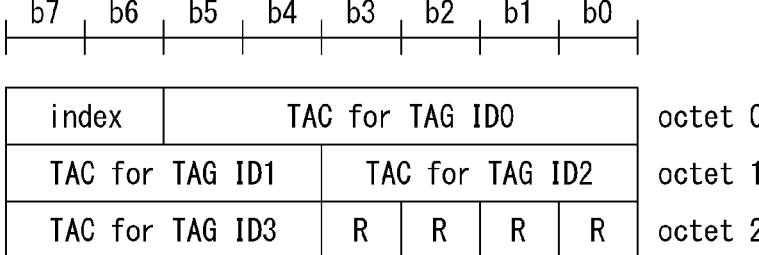
FIG. 15 is a conceptual diagram illustrating a second exemplary embodiment of a MAC CE including a TAC of each TRP (or each TAG) for a TRP set ID (or TAG combination ID).

FIG. 15 is a conceptual diagram illustrating a second exemplary embodiment of a MAC CE including a TAC of each TRP (or each TAG) for a TRP set ID (or TAG combination ID).

Referring to FIG. 15, a MAC CE may include a TRP set ID and TACs. When a TRP set ID indicates 4 TRPs, the MAC CE may include 4 TACs for 4 TRPs. A TAG ID0 may be a reference TAG ID. A TAC (or TA) for the reference TAG ID0 may be expressed by 6 bits. A TAC (or TA) for each of a TAG ID1, a TAG ID2, and a TAG ID3 may be expressed by 5 or less bits. The number of bits representing a TAC (or TA) for each of the TAG ID1, the TAG ID2, and the TAG ID3 may be defined in a technical specification. For example, the TAC (or TA) for each of the TAG ID1, the TAG ID2, and the TAG ID3 may be represented by 4 bits. The TA for each of the TAG ID1, the TAG ID2, and the TAG ID3 may be expressed as a difference from that of the reference TAG ID. The bits remaining in an octet 2 may not need to be interpreted by the terminal. The terminal may regard the bits remaining in the octet 2 as reserved bits.

In the exemplary embodiments of FIGS. 14 and 15, a mapping order of the index (or TRP set ID) or TACs constituting the octets of the MAC CE may be one example. According to a mapping method, one index or one TAC may be mapped to two octets.

For a TRP having a different PCI, in at least one of the exemplary embodiments of FIGS. 12 to 15, the MAC CE may include a PCI. In this case, the TRP set ID and the PCI may be used together. Alternatively, one of the TRP set ID and the PCI may be used. When the PCI is used, a plurality of bits may be used.

The base station (or TRP) may inform the terminal of the maximum number M of TRPs belonging to the TRP set by using RRC signaling. The number of octets constituting the MAC CE may be determined as a function of M. In consideration of activation or deactivation of a TA loop, the terminal may not interpret the TAC value at some positions within the octet.

The size of the MAC CE may be dynamically indicated by the corresponding MAC CE instead of the function of M. For example, a MAC subheader of the MAC CE may include information for deriving the size of the MAC CE. Alternatively, some bit(s) in the octet of the MAC CE may indicate M. Alternatively, whether the second octet related to the TA is located after the first octet may be known to the terminal. For example, when one or more bits in the octet have a first value, this may mean that the TAC is mapped to the next octet. When one or more bits in the octet have a second value, this may mean that the TAC is not mapped to the next octet.

Method 3.1-7: The MAC CE may include a conditional bit, and the conditional bit may indicate whether the TAC (e.g., a part of the TAC) is mapped to the MAC CE.
3.2 Triggering Method for Round Trip Time (RTT) Measurement In order to estimate a propagation delay, an Rx-Tx time difference may be calculated. The terminal may receive a DL-RS (e.g., DL PRS, CSI-RS, SS/PBCH block), derive a difference between a boundary of a DL slot and a boundary of a UL slot based on the DL-RS, and calculate the Rx-Tx time difference based on the corresponding difference. For one TRP, the terminal may detect a reception timing of a DL slot i (or subframe i), and may calculate a difference between the reception timing and a transmission timing of a UL slot j (or subframe j). Each of i and j may be a natural number. The reception timing of the DL slot i (or subframe i) may be referred to as $T_{UE-RX}$, and the transmission timing of the UL slot j (or subframe j) may be referred to as $T_{UE-TX}$. The UL slot j may be temporally close to the DL slot i. The terminal may calculate $(T_{UE-RX}-T_{UE-TX})$ by using a plurality of DL-RS resources. The plurality of DL-RS resources may be configured for different beams. The terminal may calculate $(T_{UE-RX}-T_{UE-TX})$ for each TRP and may report $(T_{UE-RX}-T_{UE-TX})$ to the TRP (or base station).

The Rx-Tx time difference measured by the TRP (or base station) may be $(T_{eNB-RX}-T_{eNB-TX})$. The $T_{eNB-RX}$ may be a reception timing of the UL slot i (or subframe i) derived based on an SRS detected by the TRP. The $T_{eNB-TX}$ may be a transmission timing of the DL slot j (or subframe j) that the TRP transmits to the terminal. The UL slot i may be temporally close to the DL slot j. The TRP may calculate $(T_{eNB-RX}-T_{eNB-TX})$ by using a plurality of SRS resources (e.g., a plurality of SRS resources for positioning). The plurality of SRS resources may be configured for different beams.

$(T_{UE-RX}-T_{UE-TX})$ may be calculated based on a DL-RS received more than once. $(T_{eNB-RX}-T_{eNB-TX})$ may be calculated based on an SRS received more than once. The DL-RSs may be transmitted/received by different beams, and the SRSs may be transmitted/received by different beams. The terminal may use a periodically-received DL-RS or a periodically-transmitted SRS. In order to measure the propagation delay between the terminal and the TRP, it may be preferable to quickly report the Rx-Tx time difference measured by the terminal to the TRP. It may be preferable that a period for measuring the Rx-Tx time difference is short and a time for reporting the Rx-Tx time difference is short. A method of reducing a time required for a reception operation in the terminal and a method of reducing a time required for a reporting operation in the terminal may be required.

Figure 16:
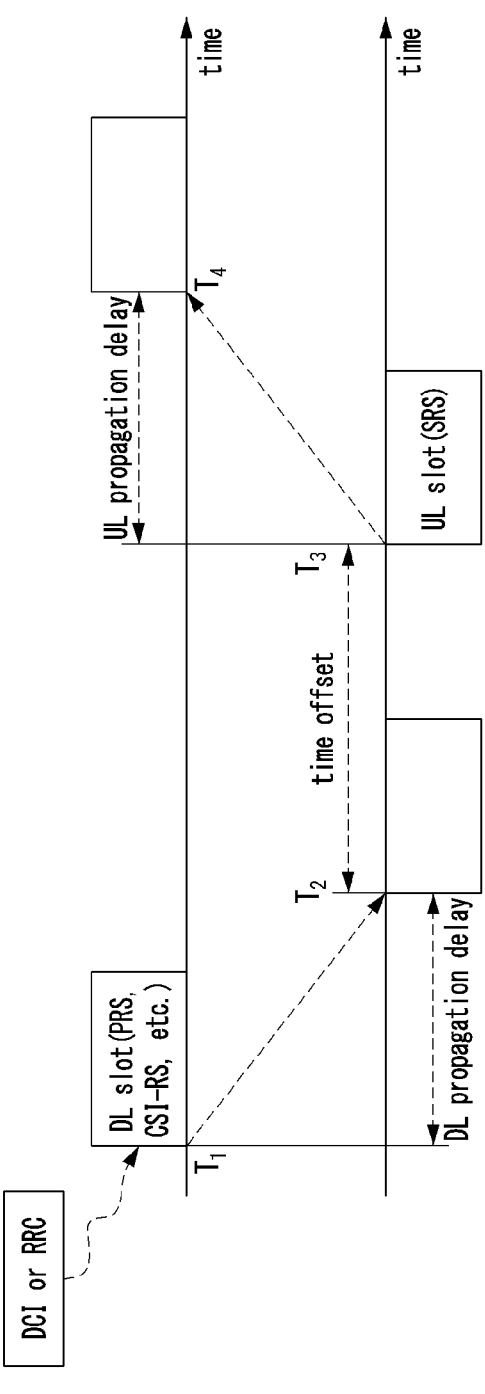
FIG. 16 is a conceptual diagram illustrating a first exemplary embodiment of a method for transmitting an SRS based on a DL-RS in a TDD system.
Figure 17:
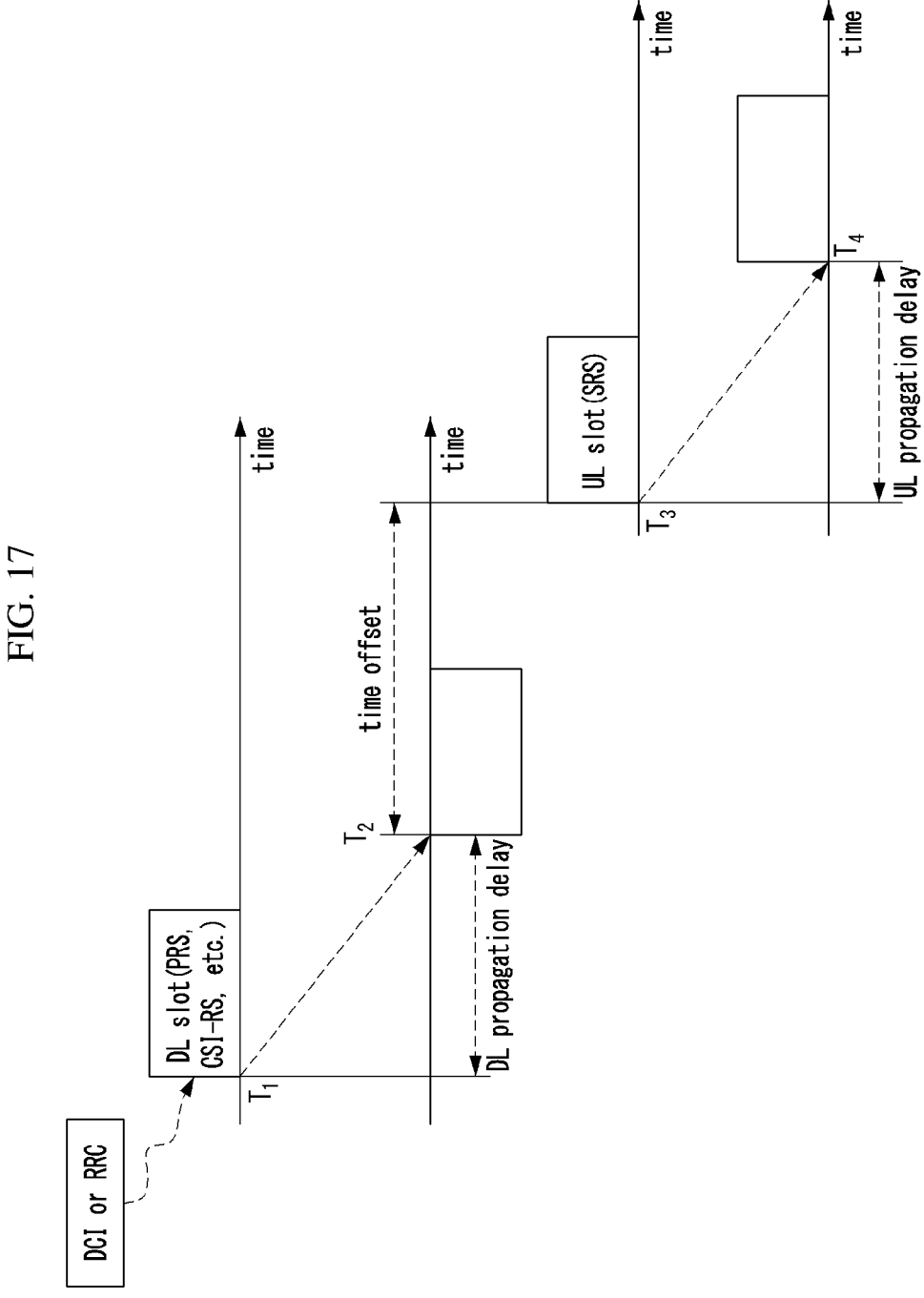
FIG. 17 is a conceptual diagram illustrating a second exemplary embodiment of a method for transmitting an SRS based on a DL-RS in a TDD system.

FIG. 16 is a conceptual diagram illustrating a first exemplary embodiment of a method for transmitting an SRS based on a DL-RS in a TDD system, and FIG. 17 is a conceptual diagram illustrating a second exemplary embodiment of a method for transmitting an SRS based on a DL-RS in a TDD system.

Referring to FIGS. 16 and 17, the TRP may transmit a DL-RS (or DL slot including the DL-RS) at $T_1$, and the terminal may receive the DL-RS (or DL including the DL-RS) at $T_2$. The terminal may transmit an SRS (or UL slot including the SRS) at $T_3$, and the TRP may receive the SRS (or UL slot including the SRS) at $T_4$. A round trip delay (RTD) may be expressed as $(T_2-T_1)+(T_4-T_3)$. That is, the RTD may be expressed as $(T_4-T_1)-(T_3-T_2)$.

The TRP may measure a time interval $(T_4-T_1)$ between a transmission timing of the DL-RS and a reception timing of the SRS, and the terminal may measure a time interval $(T_3-T_2)$ between a reception timing of the DL-RS and a transmitting timing of the SRS. A difference between $(T_4-T_1)$ and $(T_3-T_2)$ may be the RTD.

$(T_3-T_2)$ may be interpreted according to a transmission scheme of the SRS. The SRS may be transmitted periodically or semi-statically. In order to determine $T_3$, the SRS may be an SRS transmitted by the terminal receiving the DL-RS. The SRS for determining $T_3$ need not be the first SRS after reception of the DL-RS. The SRS used by the TRP for measuring the RTD or Rx-Tx time difference may be the first SRS among SRSs configured to the terminal. For example, the SRS may be an SRS for positioning. Alternatively, the SRS associated with the DL-RS may be indicated (e.g., configured) to the terminal by RRC signaling.

Transmission of the SRS may be triggered. When the DL-RS is received, the terminal may determine that transmission of the SRS is triggered. That is, the DL-RS may trigger transmission of the SRS. When a DCI is received, the terminal may assume that transmission of the SRS is triggered and the DL-RS is to be received. The TRP (or base station) may configure an association relationship between the DL-RS and the SRS to the terminal using RRC signaling.

A time resource in which the SRS is transmitted may be indicated by a slot offset, a symbol offset, and/or a TA. Parameters other than the TA (e.g., slot offset and/or symbol offset) may be indicated to the terminal by RRC signaling. Therefore, the TRP and the terminal may know the slot offset and/or the symbol offset for the time resource in which the SRS is transmitted. A minimum value of the slot offset and/or a minimum value of the symbol offset may be configured, and according to the above configuration, a processing time in the terminal may be secured.

The TA for the SRS transmission may be based on the TA indicated by the TRP. When the terminal generates an SRS sequence for the SRS transmission, $T_2$ obtained by receiving the DL-RS may be reflected to the TA for the SRS transmission. A boundary $T_2'$ of the DL slot already known by the terminal may be different from the boundary $T_2$ of the DL slot updated by the reception of the DL-RS. $(T_2-T_2')$ may mean an amount by which the boundary of the DL slot is updated. $(T_2-T_2')$ may be reflected to the SRS transmission. In this case, Method 3.2-1 or Method 3.2-2 below may be applied.

Method 3.2-1: $(T_2-T_2')$ may be applied to the TA for the SRS transmission. In the SRS transmission procedure, the terminal may assume that the boundary of the DL slot is updated, and may apply the TA from a boundary of a new DL slot (e.g., updated DL slot). Accordingly, the terminal may transmit the SRS at $T_3$, and the TRP may receive the SRS at $T_4$. When the terminal applies the TA without updating the boundary of the DL slot, the TRP may receive the SRS at $T_4'$. When the terminal applies the TA from the boundary of the updated DL slot, the TRP may receive the SRS at $T_4$. Accordingly, the reception timing of the SRS at the TRP may be changed, which may be interpreted as a change in the TA in the terminal.

Method 3.2-2: In a procedure of generating a transmission sequence of the SRS, $(T_2-T_2')$ may be applied as an argument in the frequency domain.

The transmission timing of the SRS after the reception of the DL-RS may be the same as the transmission timing of the SRS before the reception of the DL-RS, but $(T_2-T_2')$ may be applied to the transmission sequence of the SRS in the frequency domain. The time difference may be expressed as an argument difference in the frequency domain. When an argument difference (e.g., φ) for one subcarrier is derived, argument differences for the remaining subcarriers may be interpreted as offsets n·φ directly proportional to indexes (e.g., n) of the remaining subcarriers.

The argument may be applied to each of the transmission sequences of the SRS. A complex number applied to the transmission sequence of the SRS may be further multiplied by $e^{j n \cdot \varphi}$. The TRP may receive the SRS to detect the argument, and may estimate the propagation delay between the TRP and the terminal based on the argument.

The terminal may receive a DCI, and the DCI may indicate triggering for the DL-RS. The SRS transmission may be triggered after a preset time from the reception timing of the DL-RS. If the terminal transmits the SRS before the lapse of the preset time, $(T_2-T_2')$ may not be reflected to the argument difference applied to the transmission sequence of the SRS.

The exemplary embodiments of the present disclosure may be implemented as program instructions executable by a variety of computers and recorded on a computer-readable medium. The computer-readable medium may include a program instruction, a data file, a data structure, or a combination thereof. The program instructions recorded on the computer-readable medium may be designed and configured specifically for the present disclosure or can be publicly known and available to those who are skilled in the field of computer software.

Examples of the computer-readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of a terminal in a communication system including a first transmission reception point (TRP), a second TRP, and the terminal, the operation method comprising:

receiving, from the first TRP, a radio resource control (RRC) message including information instructing to perform a reception operation for the first TRP and the second TRP;

receiving a first downlink-reference signal (DL-RS) by performing the reception operation for the first TRP and the second TRP; and performing communication with at least one TRP among the first TRP and the second TRP based on the first DL-RS, wherein the first DL-RS is received from at least one of the first TRP or the second TRP, and wherein in response to the first DL-RS being a demodulation-reference signal (DM-RS) and the first TRP and the second TRP having a same PCI or in response to the first DL-RS being a DM-RS and the first TRP and the second TRP having different PCIs, the DM-RS is used for demodulation of a physical downlink control channel (PDCCH) or a physical downlink shared channel (PDSCH).

2. The operation method according to claim 1, further comprising transmitting, to the first TRP, information indicating whether the reception operation for the first TRP and the second TRP is supported by the terminal.

3. The operation method according to claim 1, further comprising receiving, from the first TRP, one or more parameters used for reception of the first DL-RS.

4. The operation method according to claim 3, wherein the one or more parameters include at least one of a physical cell identifier (PCI), a scrambling identifier (ID), a synchronization signal/physical broadcast channel (SS/PBCH) block index, a subcarrier spacing, frequency information of an SS/PBCH block, or a combination thereof.

5. The operation method according to claim 1, wherein two or more transmission configuration indication (TCI) states are indicated to the terminal in order for the terminal to receive the first DL-RS.

6. The operation method according to claim 1, wherein two or more TCI-states are derived from one index indicated to the terminal in order for the terminal to receive the first DL-RS.

7. The operation method according to claim 1, further comprising receiving, from the first TRP or the second TRP, random access (RA) configuration information associated with the first DL-RS, wherein the communication is an RA procedure based on the RA configuration information.

8. The operation method according to claim 1, further comprising receiving, from the first TRP or the second TRP, a parameter related to a beam recovery procedure associated with the first DL-RS, wherein the communication is a beam recovery procedure based on the parameter.

9. An operation method of a first transmission reception point (TRP) in a communication system including the first TRP, a second TRP, and a terminal, the operation method comprising:

receiving, from the terminal, information indicating that a reception operation for the first TRP and the second TRP is supported by the terminal;

transmitting, to the terminal, a radio resource control (RRC) message including information instructing to perform the reception operation for the first TRP and the second TRP; and transmitting a first downlink-reference signal (DL-RS) to the terminal, wherein in response to the first DL-RS being a demodulation-reference signal (DM-RS) and the first TRP and the second TRP having a same PCI or in response to the first DL-RS being a DM-RS and the first TRP and the second TRP having different PCIs, the DM-RS is used for qdemodulation of a physical downlink control channel (PDCCH) or a physical downlink shared channel (PDSCH).

10. The operation method according to claim 9, further comprising transmitting, to the terminal, one or more parameters used for reception of the first DL-RS.

11. The operation method according to claim 10, wherein the one or more parameters include at least one of a physical cell identifier (PCI), a scrambling identifier (ID), a synchronization signal/physical broadcast channel (SS/PBCH) block index, a subcarrier spacing, frequency information of an SS/PBCH block, or a combination thereof.

12. The operation method according to claim 9, further comprising transmitting, to the terminal, at least one of random access (RA) configuration information associated with the first DL-RS or a parameter related to a beam recovery procedure associated with the first DL-RS.

13. A terminal in a communication system including a first transmission reception point (TRP), a second TRP, and the terminal, the terminal comprising:

a processor;

a memory electronically communicating with the processor; and instructions stored in the memory, wherein when executed by the processor, the instructions cause the terminal to:

receive, from the first TRP, a radio resource control (RRC) message including information instructing to perform a reception operation for the first TRP and the second TRP;

receive a first downlink-reference signal (DL-RS) by performing the reception operation for the first TRP and the second TRP; and perform communication with at least one TRP among the first TRP and the second TRP based on the first DL-RS, wherein the first DL-RS is received from at least one of the first TRP or the second TRP, and wherein in response to the first DL-RS being a demodulation-reference signal (DM-RS) and the first TRP and the second TRP having a same PCI or in response to the first DL-RS being a DM-RS and the first TRP and the second TRP having different PCIs, the DM-RS is used for demodulation of a physical downlink control channel (PDCCH) or a physical downlink shared channel (PDSCH).

14. The terminal according to claim 13, wherein the instructions further cause the terminal to transmit, to the first TRP, information indicating whether the reception operation for the first TRP and the second TRP is supported by the terminal.

15. The terminal according to claim 13, wherein two or more transmission configuration indication (TCI) states are indicated to the terminal, or two or more TCI-states are derived from one index indicated to the terminal in order for the terminal to receive the first DL-RS.

16. The terminal according to claim 13, wherein the instructions further cause the terminal to receive, from the first TRP or the second TRP, at least one of random access (RA) configuration information associated with the first DL-RS or a parameter related to a beam recovery procedure associated with the first DL-RS.

* * * * *